United States Patent [19]
Straayer et al.

[11] Patent Number: 5,619,246
[45] Date of Patent: Apr. 8, 1997

[54] APPARATUS AND METHOD OF POSITIONING PHOTOSENSITIVE MEDIA ON AN EXPOSURE PLATEN

[75] Inventors: Ronald J. Straayer, S. Windsor; Bruce L. Davidson, East Hartford; Alan W. Menard, Bolton; Thomas J. Suhr, Manchester, all of Conn.; Uri Bin-Nun, Keene, N.H.; Timothy P. MacDonald, South Windsor, Conn.

[73] Assignee: Gerber Systems Corporation, South Windsor, Conn.

[21] Appl. No.: 117,612

[22] Filed: Sep. 7, 1993

[51] Int. Cl.[6] .................................................. B41J 2/435
[52] U.S. Cl. ........................ 347/262; 347/164; 346/134
[58] Field of Search ............................. 347/164, 262, 347/264; 346/134, 136

[56] References Cited

U.S. PATENT DOCUMENTS

| | | | |
|---|---|---|---|
| 4,334,770 | 6/1982 | Landsman | 355/104 |
| 4,389,117 | 6/1983 | Floyd et al. | 355/87 |
| 4,479,147 | 10/1984 | Rossini | 358/290 |
| 4,488,716 | 12/1984 | Sheck . | |
| 4,920,383 | 4/1990 | Cook | 355/311 |
| 5,087,025 | 2/1992 | Hamada | 271/268 |

FOREIGN PATENT DOCUMENTS

| | | |
|---|---|---|
| 0144911 | 6/1985 | European Pat. Off. . |
| 3047178 | 7/1982 | Germany . |

*Primary Examiner*—Mark J. Reinhart
*Attorney, Agent, or Firm*—McCormick, Paulding & Huber

[57] ABSTRACT

An apparatus includes a media handler which is capable of processing a supply of media sheets which can take the form of plates, aluminum or plastic used in lithographic printing presses or the like, or can be film which is advanced to a drum and scanned by a scanning process and thereafter removed from the drum surface by appropriate handling means.

37 Claims, 18 Drawing Sheets

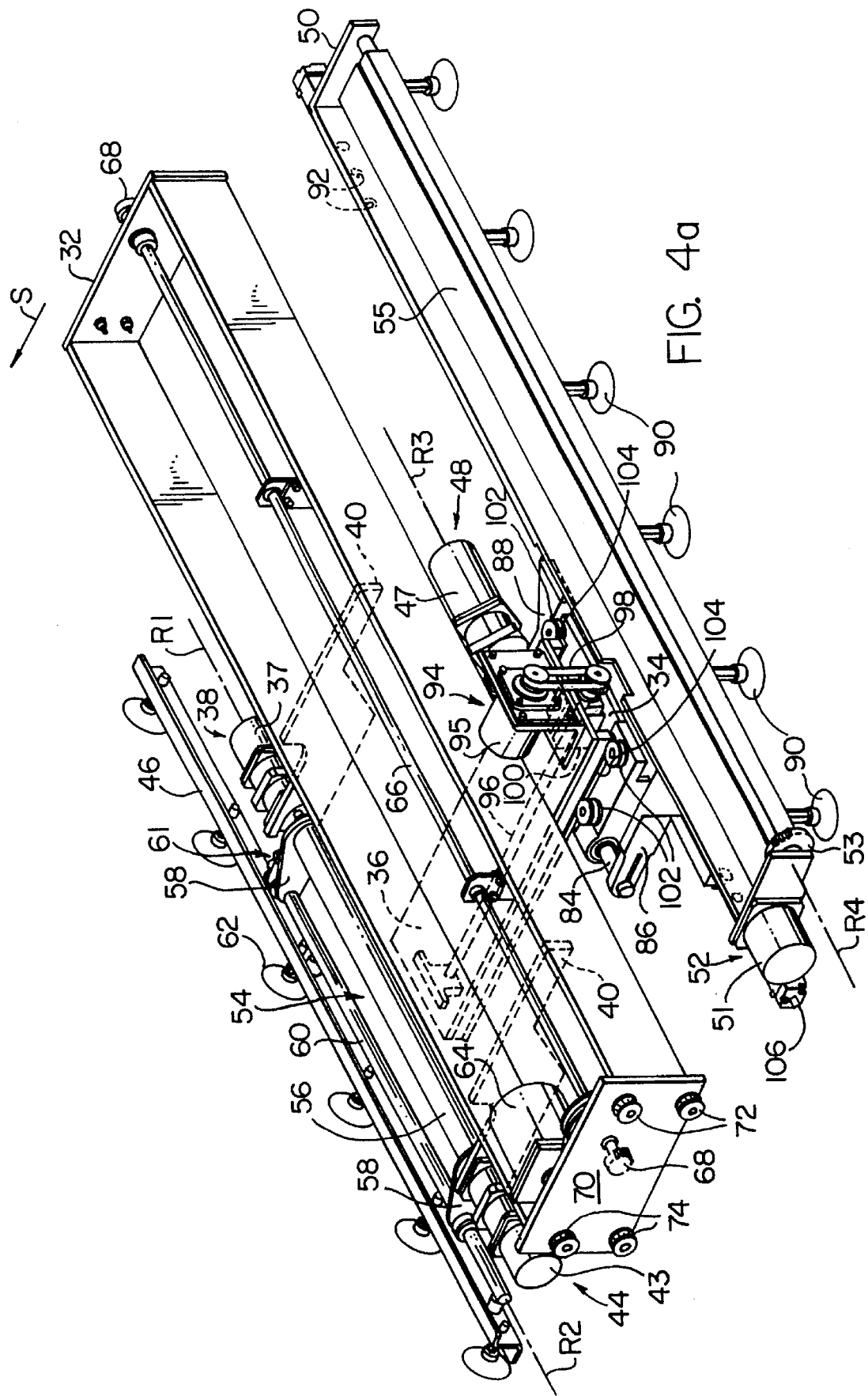

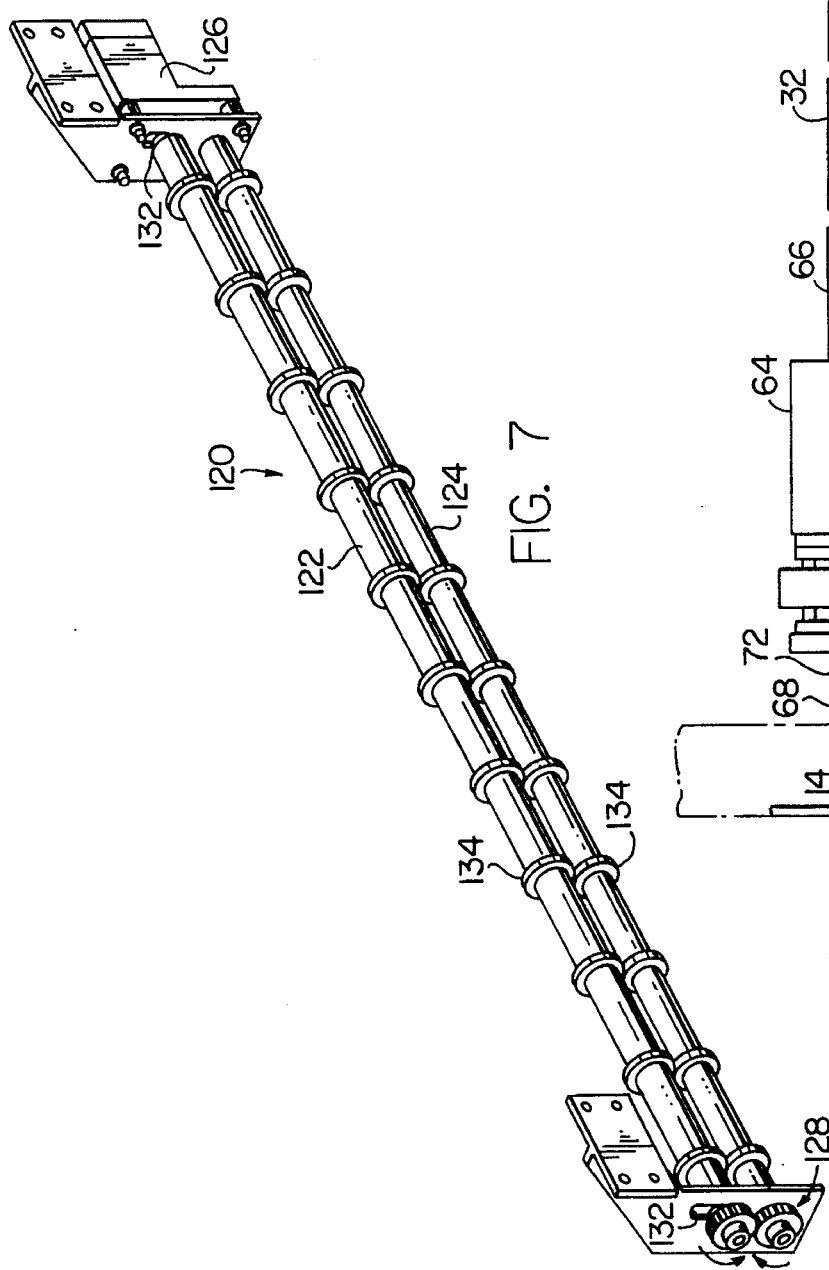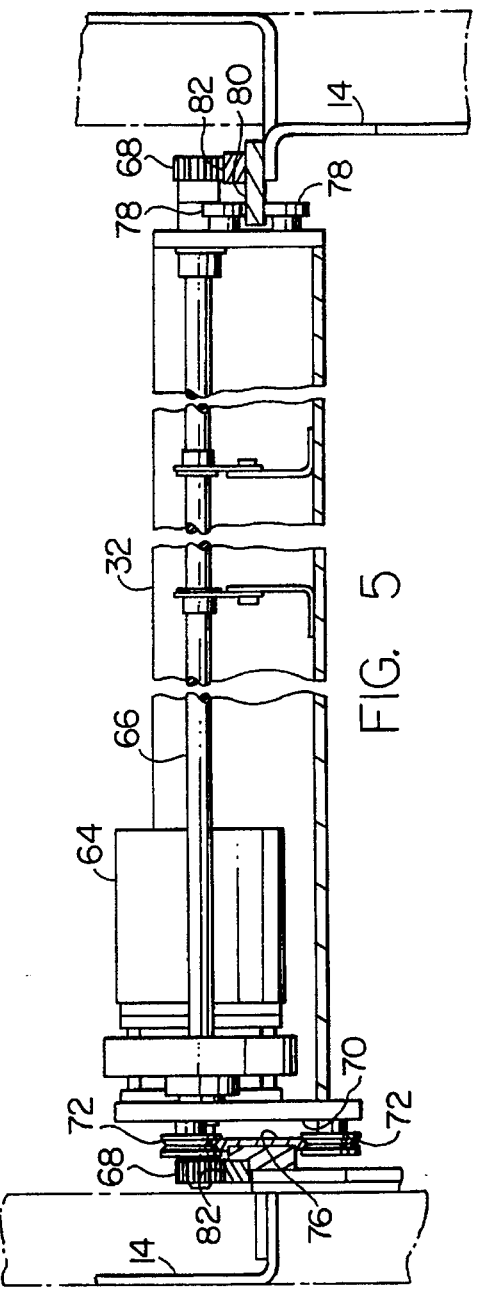

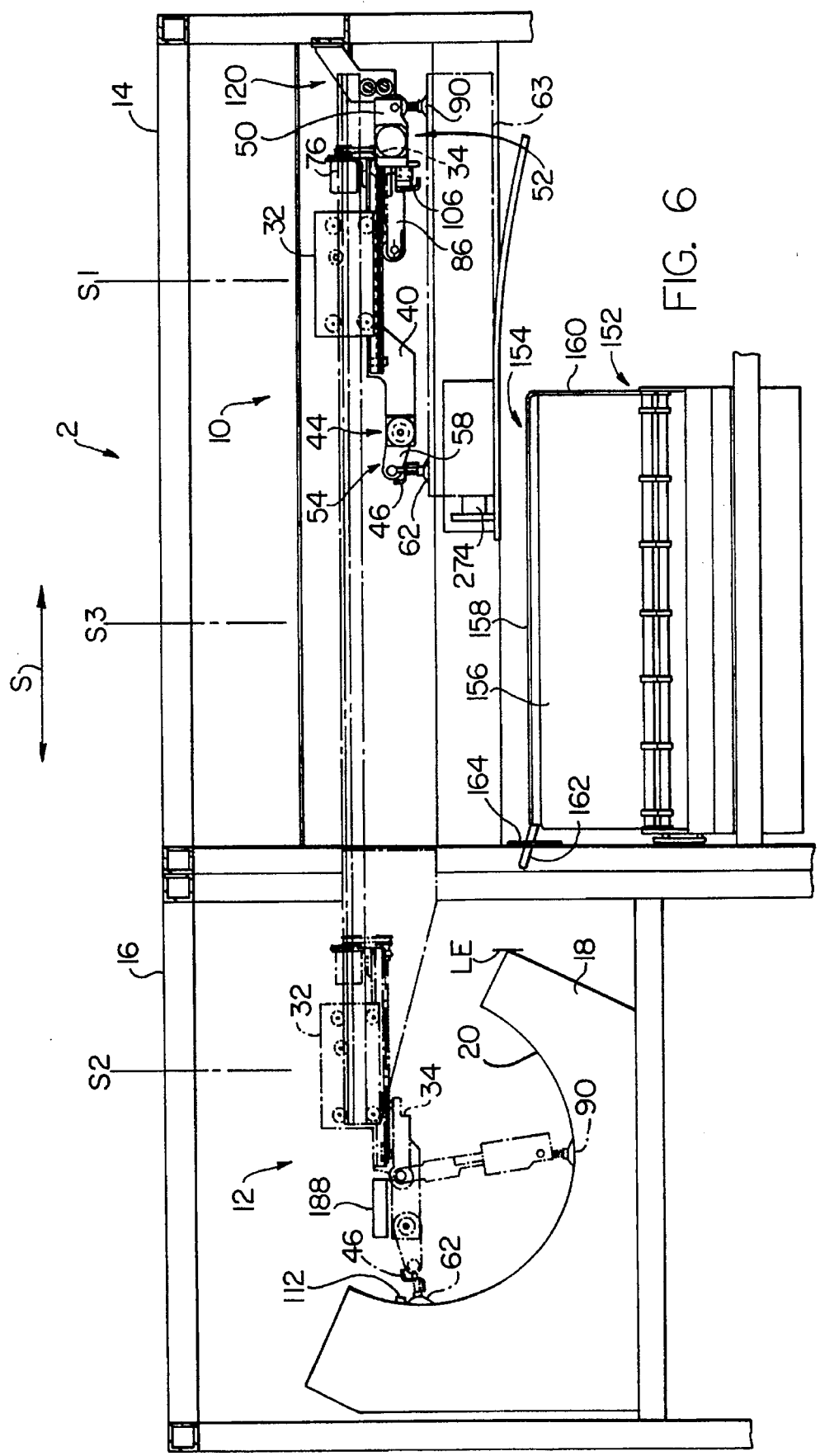

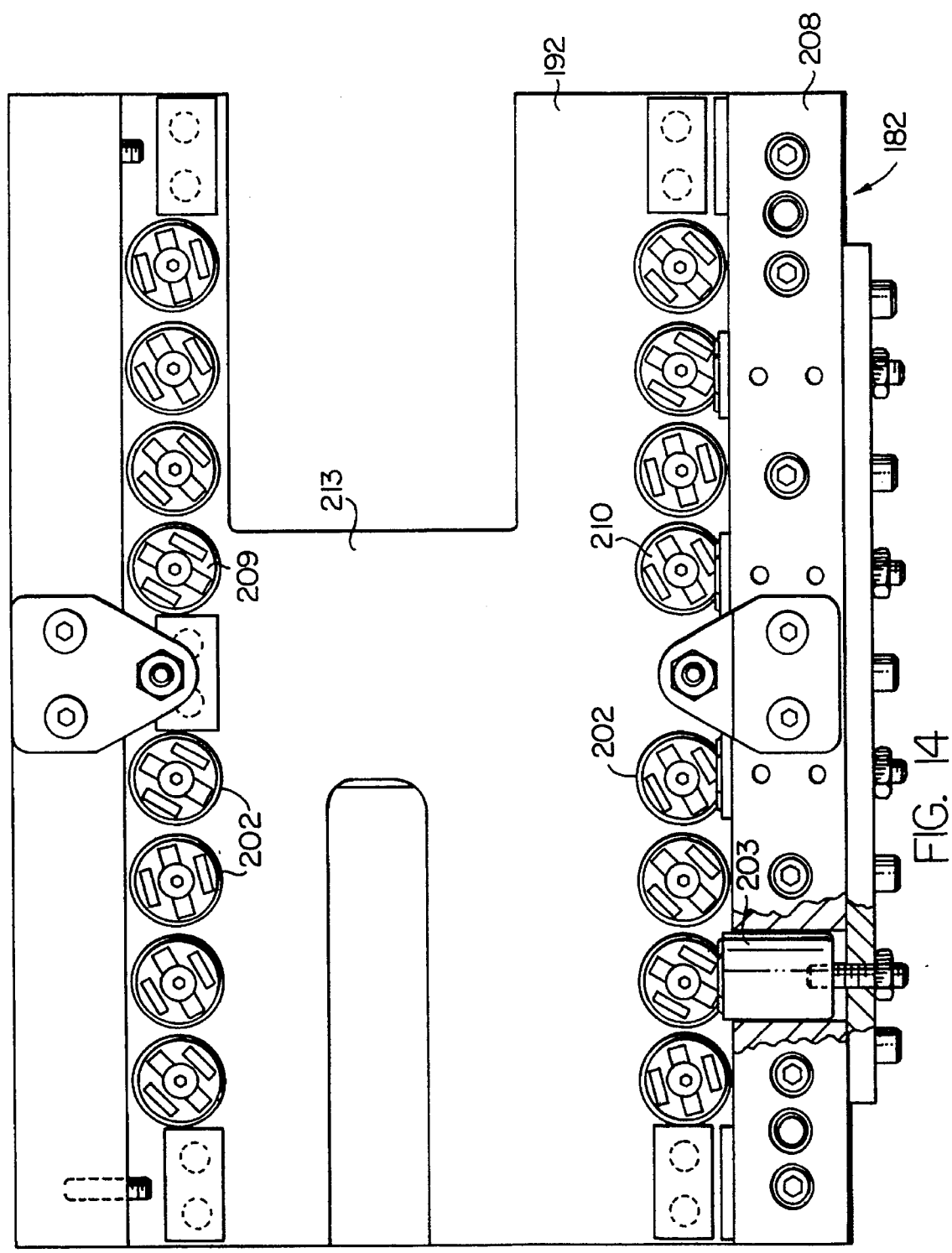

APPARATUS AND METHOD OF POSITIONING PHOTOSENSITIVE MEDIA ON AN EXPOSURE PLATEN

CROSS REFERENCE TO RELATED APPLICATION(S)

The present invention relates to co-pending U.S. patent application Ser. No. 07/839,398, filed in the name of Alan Menard, et al. on Feb. 20, 1992, and entitled PLOTTER DRUM AND METHODS OF FABRICATION AND ALIGNMENT THEREFOR, which application being commonly assigned with the present invention, and relates also to copending U.S. application Ser. No. 08/071,567, filed on Jun. 1, 1993, in the name of Wolfson, et al., and titled SYSTEM FOR HANDLING CURVED FORM MEDIA AND CASSETTE THEREFOR.

BACKGROUND OF THE INVENTION

This invention relates to a system for positioning a photosensitive media sheet on an exposure platen in registration with a given datum from which datum a scanning operation is conducted on the media sheet and deals more particularly with a media handling system wherein conformable media is capable of being handled from a supply of such media in flat form and configured by the system to take the shape of the drum support surface and further deals with an improvement in laser scanners wherein motion controls of the spinner assembly are directly dependent upon the desired print resolution of the image.

Exposing of media by scanning is made more efficient through the use of drum plotters which employ a rapidly spinning projection mirror which directs a light beam from a laser source downwardly onto the photosensitive material which is supported on the drum support surface. Media which is supported on the drum surface must be flexible enough to conform to the arcuate contour of this surface, but made of a strong enough material to be used, for example, directly in a lithographic printing press. Media consists of a photographically sensitive coating, e.g. emulsion, on a base material of polyester or aluminum. Such media sheets are usually provided in a supply of such sheets layered onto each other in a flat orientation and contained in a cassette. As such, any handling device which is used to automatically load the media sheets into drum plotters must be capable of handling a somewhat mechanically unstable element between this supply station and the scanning station, and thereafter to any subsequent handling station, such as one wherein the media is developed.

Media of the type of which the present invention is concerned has a photosensitive layer or emulsion formed on it which is sensitive to radiant energy in a given wavelength to expose areas of the emulsion where a positive or negative image is to be made. In some instances, the emulsion used is sensitive to room light, and it is therefore necessary that loading and scanning operations be done in "dark rooms". Operating in dark rooms is not advantageous from a production standpoint because the workers involved in the handling process must operate in a dimly light room, usually under red light and must always be conscious about the exposure of media to stray room light, such as when a door opens.

Accordingly, it is an object of the invention to provide a media handling system whereby media is taken from a supply of media loaded into the system in a light-tight condition and is thereafter scanned within the light-tight confines of a scanning apparatus.

It is yet a further object of the invention to provide a media handling device for a plotter wherein the media handled is one which is flexible and the handling device is capable of picking and placing an individual media sheet and conforming it to a given configuration so that it can be supported on the partial cylindric support surface of a drum plotter.

Still a further object of the invention is to provide a highly accurate scanning system which is capable of scanning on a media sheet with different pixel densities and light spot diameters in accordance with graphic information inputted as code into the plotter.

Yet a further object of the invention is to provide a scanner in which vibrations otherwise acting on the scanner components are insulated therefrom by structure which negates the effects of such vibrations.

Still a further object of the invention is to provide a scanner of the aforementioned type wherein scan speed and spinner axis axial movement are related to the maximum resolution capabilities of the system.

SUMMARY OF THE INVENTION

The invention resides in a scanning device, a related material handler and related methods wherein a frame is provided and supports a drum having a means for holding a media sheet on the support surface in registration with at least one reference axis and having a partially cylindric support surface extending along a central axis of a given radius of curvature taken along the central axis. A scanning means is supported by the frame and is juxtaposed relative to the support surface so as to cause a light beam to sweep a path across the support surface. The frame defines a means for receiving a supply of media sheets and maintaining the supply of media sheets in a given orientation with respect to the at least one reference axis. The frame supports a transport means extending between the drum and the supply means for lifting a media sheet from the supply of the media sheets and advancing it onto the support surface where a scanning operation is conducted on it and for removing the media sheet from the support surface after scanning. The supply means maintains the sheets of media in a substantially flat condition and the transport means causes the transported media sheet to conform to a partially cylindric configuration after lifting it from the supply means for placement onto the correspondingly shaped partially cylindric support surface.

The invention also resides in a system and method for creating a pixel clock for clocking image data to a lasar in a scanner of the type having a rotating spinner mirror which is responsible for re-directing a light beam directed along its spinner axis onto a partially cylindric drum support surface spaced a given distance from the axis by using the spinner velocity as a reference clock to establish a data rate for the pixel information and for the linear positioning of the spinner mirror along an axis.

BRIEF DESCRIPTION OF THE DRAWINGS

FIG. 4a is a perspective view of the media transport device.

FIG. 4b is a side elevation view of the transport device of FIG. 4a.

FIG. 5 is a rear elevation view of the main carriage.

FIG. 6 is a side elevation view of the apparatus showing the transport device in its extended position in dotted line.

FIG. 7 is a perspective view showing the discharge roller mechanism of the apparatus.

FIG. 14 is a top plan view of the spinner assembly carriage with the way removed.

DETAILED DESCRIPTION OF THE PREFERRED EMBODIMENT

Figure 1:
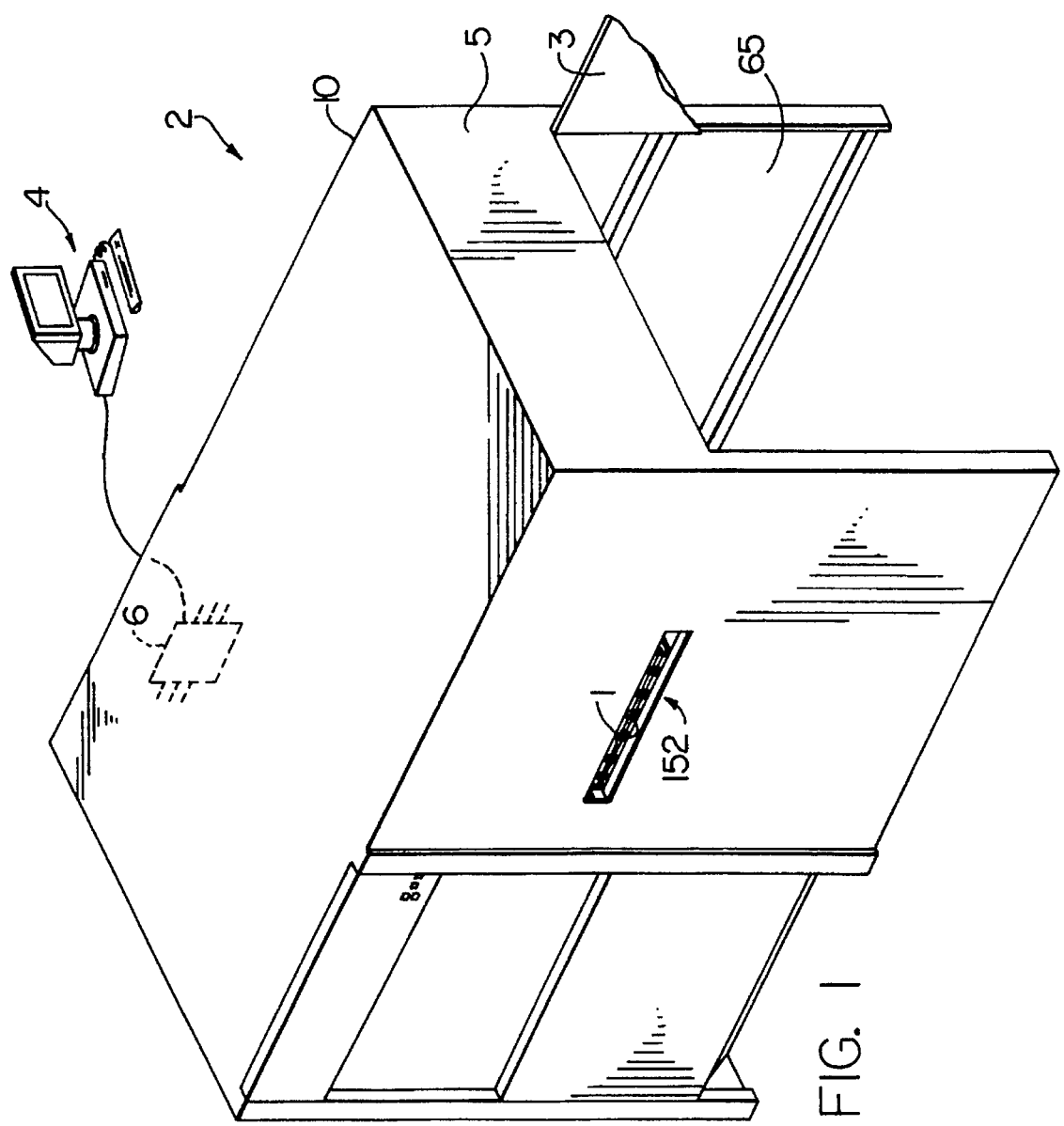
FIG. 1 is a perspective view of the plotter and media handler apparatus shown enclosed by its housing.

Referring now to FIG. 1, a photoplotting and handling system is there shown. The system includes an apparatus indicated generally at 2, a host computer 4 linked to a system controller 6 disposed within the main apparatus responsible for managing image information downloaded from the host computer 4 and for controllably moving articulated parts of the system in accordance with numeric control instructions issued by the system controller. The computer and the system controller are connected by an appropriate control data line, which can be for example, a RS-232 C line.

The apparatus as illustrated in FIG. 1 is specifically adapted to be used for light-tight applications. For this purpose, the apparatus is enclosed against light penetration by a housing 5 and light-tight doors 3,3 which when open, permit access by an operator into the interior confines of the apparatus for purposes of loading media and for system maintenance. An opening 1 is also made in one side of the housing for the purpose of discharging media in a manner which will hereinafter become apparent, and this opening will open to another light-tight environment, such as a processor handler.

Figure 2:
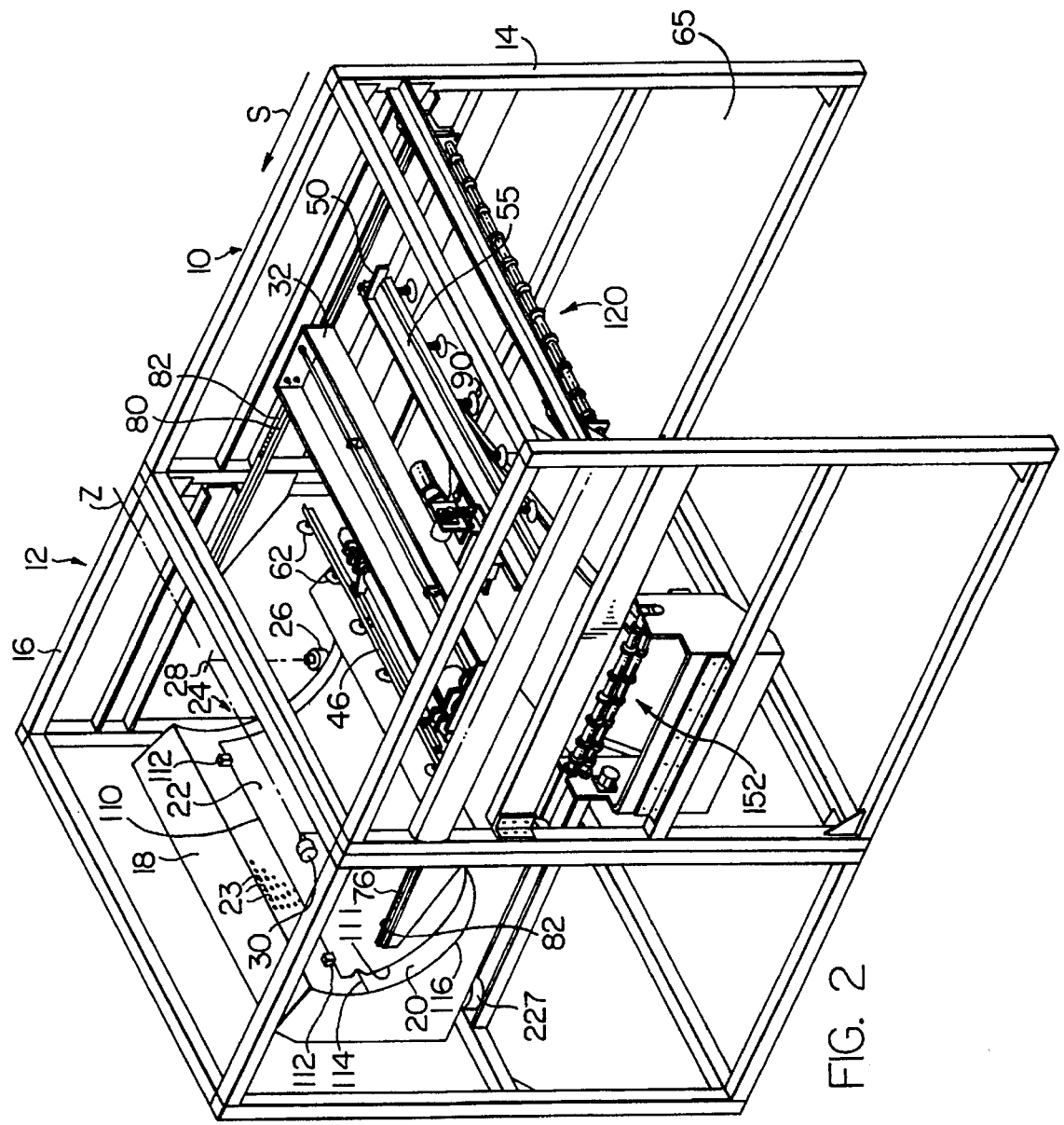
FIG. 2 is a perspective view of the apparatus shown in FIG. 1 with its housing removed.

The apparatus 2 as illustrated in FIG. 2 is comprised of a media handler 10 and a photoplotter 12 each supported within separate box-like frame structures 14 and 16, respectively, and are connected as modules to create a single unit as illustrated, but are capable of being operated apart from one another, such as in the case where the plotter is desired to be used separately of the handler.

The plotter includes a crescent-shaped drum 18 having a part cylindrical support surface 20 for supporting a media sheet 22 on the drum in a given orientation relative to a point along the indicated central axis z. It being noted here that the term part cylindric as used to describe the surface 20 means that the surface 20 has a uniform radius of curvature as taken along the Z axis which gives it in cross section an arcuate shape. A plurality of pin holes 23,23 are formed in the surface 20 and are provided for the purpose of drawing the involved media sheet down onto the drum under vacuum pressure. The drum for this purpose includes a manifold system disposed below the surface 20 and communicates between the holes 23 and a pressurized air source (not shown). For a more complete description of the basic construction of the drum 18, reference may be had to the aforementioned co-pending U.S. patent application Ser. No. 07/839,398, filed in the name of Alan Menard, et al. on Feb. 20, 1992, and entitled PLOTTER DRUM AND METHODS OF FABRICATION AND ALIGNMENT THEREFOR.

The photoplotter includes a scanning means 24 comprising a laser radiant energy source 26 secured against movement to the drum 18, a light re-directing mirror 28 which is also secured to the frame 16 so as to re-direct the light beam emitted by the laser 26 coincidentally along the central axis Z of the drum 18. The scanning means further includes a spinner assembly 30 which comprises an off-axis parabolic mirror for causing the light beam directed along the Z axis to be turned orthogonally toward the support surface 20 and swept through a given arc across the media sheet in raster format, and focussed to the media surface. While not shown in FIG. 2 for purpose of clarity, the spinner assembly 30 is controllably moveably mounted along the axis Z through an appropriate way system which is secured to and cantilevered outwardly of the drum 18.

Turning now to the structure of the media handler 10, it should be seen that the handler includes a main carriage 32 adapted for movement along rails secured to the frame 14 for movement in the indicated S direction of travel between a home position S1 corresponding to the location of a supply of media, and an end of travel position S2 corresponding to the location where onloading and offloading of the media to and from the drum occurs and an intermediate S3 position corresponding to where the media is release to a discharge means for transport away from the apparatus. A secondary carriage 34 is provided and is carried by the main carriage and is moveable relative to it along a way 36 secured against movement to the main carriage and disposed in the S direction of travel.

Each of the main and secondary carriages 32 and 34 include two rotary positioning means for handling the media in coordinated linear and rotational movement such that the media can be lifted from an otherwise flat stack supply of such media and transported to the drum in a part cylindric form. To these ends, a first rotational drive means 44 having a first stepper positioning motor 43 is mounted to the main carriage forwardly outwardly of it on two mounting arms 40,40 for rotating a generally U-shaped yolk member 54 defined by a transverse bar 56 and two spaced subarms 58,58 extending orthogonally outwardly from the transverse bar 56. The yolk is journalled within the support arms 40,40 and is drivingly connected to the drive motor 43 so as to cause the transverse bar member 56 to be rotated about the R1 axis. The mounting arms 40,40 also support a second rotational drive means 38 having a second stepper motor 37 for rotating a pick up bar 46 about a second rotational axis R2 which is spaced outwardly and parallel to the rotational axis R1. Journalled within the the subarms 58,58 is a rotating bar 60 which is connected for unitary rotational movement with the pick up bar 46 about the R2 axis. The drive motor 37 associated with the second drive means is mounted to the other of the support arms not holding the drive motor 43 and is drivingly rotatably coupled to the first pick up bar 46 through the intermediary of a notched belt pulley system 61 connected between the output sprocket of the motor 37 and the rotating bar 60. Disposed along the length of the pick up bar 46 are a plurality of suction gripper elements 62,62 which are each individually connected to a vacuum source for the purpose of engaging the top one of a supply of media and lifting it upwards for subsequent handling by the system in a manner that hereinafter will become apparent.

The secondary carriage 34 includes a third rotational drive means 48 having a third stepper motor 47 for rotating a locating bracket 50 about a third rotational axis R3. The locating bracket includes two spaced clamping arms 86,88 rigidly connected to it and clamped to a second rotating bar 84 so that the drive motor 47 of the third drive means 48 controllably rotates the second rotating bar 84 and the two clamping arms 86 and 88 which connect the bracket 50 to the secondary carriage for rotation about the R3 axis. Mounted on the locating bracket 50 is a fourth rotational drive means 52 which includes a fourth stepper motor 51 for controllably rotating a second pick up bar 55 about a fourth rotational axis R4. The second pick up bar 55 is rotatably journalled in the bracket 50 so as to be controllably rotated about the R4 axis by a gear drive system 53. A plurality of suction gripper elements 90,90 are secured to the second pick up bar 55 and are each separately connected to a vacuum source for controlled pickup of the media. Additionally, the back face of the second pickup bar 55 includes a plurality of pin holes 92,92 which communicate with internal chambers formed within the pick up bar 55, which chambers are connected by separate lines to the vacuum source through dedicated lines separate from those which connect to the suction grippers 90,90.

The main carriage 32 includes a drive motor 64 which is positively drivingly coupled to a drive bar 66 having pinion gears 68,68 non-rotatably connected to it to effect movement between the indicated S1 position immediately over the cassette 63 and the indicated S2 position disposed generally adjacent and above the leading edge LE of the drum 18. Disposed on one lateral side face 70 of the carriage 32, are two pairs 74,74 and 72,72 of vertically spaced guide rollers each having a circumferential groove formed in it to correspondingly mate with a horizontally disposed way 76,76 secured to the frame 14. In a similar manner, two pairs of vertically spaced smooth rollers 78,78 are disposed on the opposite face of the carriage 32 and travel along ways 80,80 fixed to the frame 14 in a parallel spaced relationship to each other and to the ways 76,76. Disposed vertically intermediate the upper and lower ways on each side of the frame 14 is an elongate rack 82,82 which co-acts with the pinion gears 68,68 disposed on opposite sides of the main carriage. Through this co-action, the main carriage through the energization and de-energization of the drive motor 64 is caused to be controllably moved between the S1, S2 and the S3 positions.

The secondary carriage 34 is linearly moveable on the way 36 relative to the main carriage 32 through the intermediary of a secondary drive means 94. This means includes a second linear drive motor 95, a lead screw 96 drivingly coupled to the output shaft of the motor 95 through the intermediary of a drive belt 98, and a drive nut 100 secured against movement to the carriage 34 so as to transfer the otherwise rotary motion delivered by the drive motor 95 into linear controlled movement in two directions along the indicated S direction of travel. The secondary carriage 34 further includes two pairs of guide rollers 102,102 each having a circumferential groove formed in it for co-acting with correspondingly formed guide edges 104,104 disposed on the way in a parallel orientation along opposite side edges thereof.

Figure 4B:
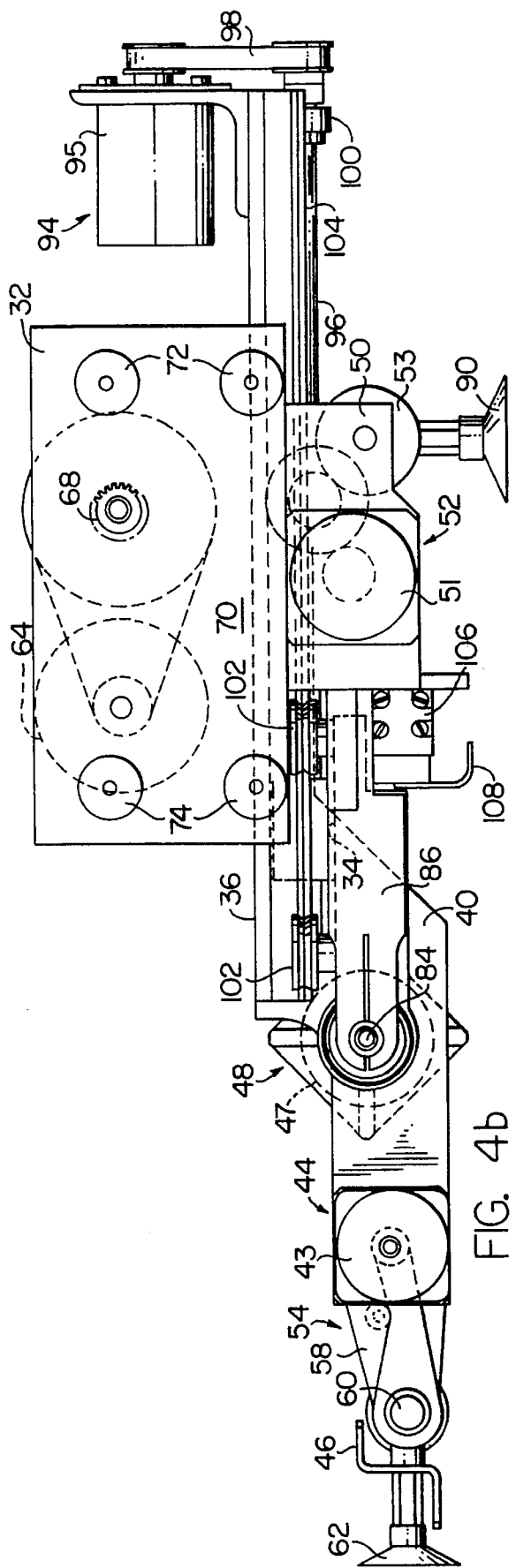

The secondary carriage 34 through its mounting bracket 50, as best illustrated in FIG. 4b, also carries a slide band type actuator mechanism 106 having a depending hook-like member 108 secured to its sliding output. The hook member 108 is normally maintained at the right side of the bracket for the purpose of moving transversely of the advancement line S to open an otherwise closed cassette cover as will become more readily apparent later when specific reference is made to the details of the cassette.

Figure 3:
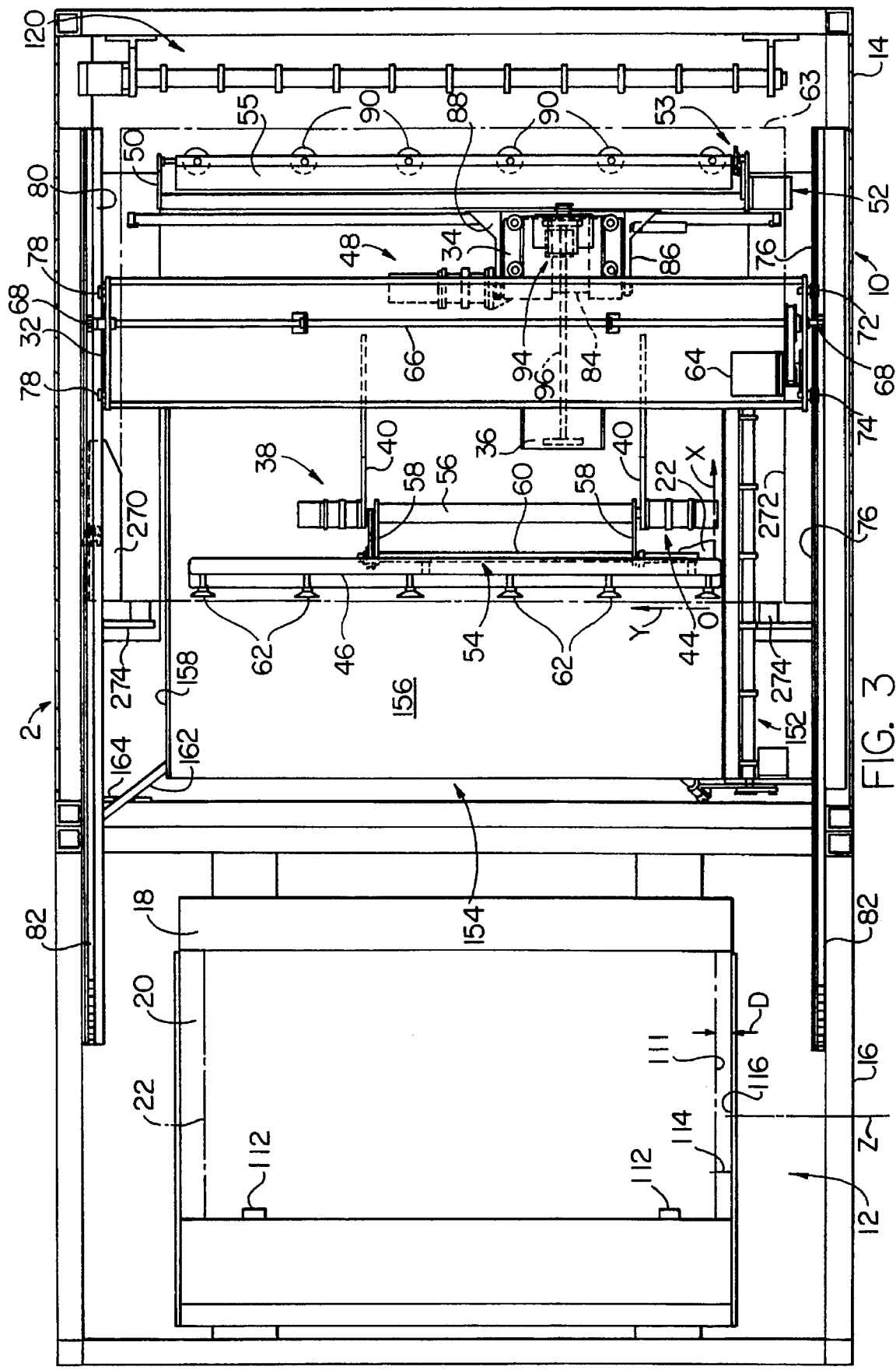
FIG. 3 is top plan view of the apparatus shown in FIG. 2.

The frame 14 of the media handler provides a receiving bay 65 which is immediately adjacent the doors 3,3 for receiving a supply cassette 63 in which a supply of media in stack form is contained. The sheets of the stack although uniform in size and in shape can nevertheless vary in size from stack to stack. The media sheets can have a maximum sheet size of 42 inches×32 inches to a range of 26 inches×20 inches or less, with the larger dimension being the dimension taken parallel to the axis Z. Notwithstanding, any sheet contained within the cassette 62 is uniformly justified to a given datum. As illustrated in FIG. 3, this datum is indicated by the point $\underline{0}$ corresponding to the intersection of the indicated X and Y coordinate axes. That is, each media sheet that is maintained within the cassette 63 will have its lower left corner in abutment with internal side faces of the cassette extending coincidentally with the indicated X and Y coordinate directions. In this way, the leading edge 110 of the media lies coincidentally with the indicated Y coordinate axis disposed parallel to the Z axis, while the lateral side edge 111 of the media sheet lies coincidentally with the indicated X coordinate axis. Any variation in the width of the sheet along the X coordinate direction is compensated for by moving the secondary carriage 34 to a position over the media such that the second row of suction grippers 90,90 are disposed along the media sheet immediately adjacent its trailing edge. In this way, frontal and rearward areas of the media sheet immediately adjacent will be covered by one or all of the suction grippers 62,62 and 90,90.

Referring now to FIG. 6 it should be seen that a media sheet is drawn off the cassette 63 and is placed onto the support surface 20 of the drum 18 in registration with a given datum taken relative to a spinner axis Z, and that a media handler 10 initially locates the main carriage 32 at the S1 location above the cassette 63 with the suction gripper elelments each oriented in a depending orientation. The system controller 6 instructs the stepper motors 37, 43, 47 and 51 respectively associated with the R1, R2, R3 and R4 axis drive means to rotate the first and second pick up bars 46 and 55 downwardly so as to cause the respective gripper suction elements 62,62 and 90,90 to engage the topmost sheet of the media 22. Along with this motion, the appropriate solenoid valve is activated to introduce vacuum to both rows of gripper elements. Vacuum pressure to the suction grippers elements is then sensed to determine if a seal has occurred. If none is established, then an error condition is indicated, otherwise the handling process continues. The R1, R2, R3 and R4 axes drive motors are then reversed so as to cause the media sheet to be raised in the indicated condition shown in FIG. 6 at the S1 station. Thereafter, the drive motor 64 of the main carriage is caused to be energized so as to advance the carriage toward the drum 18. It should be appreciated here that the drum half cylinder support surface opens to the main carriage at an angle of approximately 25 degrees. This feature allows media to be directly linearly advanced to the support surface 20 along a direct line of travel as provided for by the ways 76,76 and 80,80 without having to lifted over an otherwise upstanding edge. Thus, as the media sheet begins to approach the leading edge LE of the drum it is conformed such that the media assumes the substantially arcuate shape provided for by the drum support surface. This is done by controlled linear movement of the secondary carriage relative to the main carriage in conjunction with the R3 axis control motor being rotated so as to rotate the mounting bracket 50 from an otherwise 3 o'clock position to a generally 6 o'clock orientation. Concurrently with this movement, the R4 axis motor is thereafter rotated in a counter-clockwise condition to pull the trailing edge of the media sheet up to conform it to a generally half cylindric configuration.

Such conforming of the media to the part cylindric shape is of course dependent on material thickness and type. Notwithstanding, the media handler 10 is capable of handling a variety of media having various thickness and dimensions. For example, the apparatus is capable of handling media in the form of photosensitive plates used in a lithographic presses which, in one case, use an aluminum base and having a total thickness of between 8 to 16 mils, or may alternatively be plates having a polymer base having a thickness on the order of 7 to 12 mils. Additionally, the media can consist of a film whose thickness is somewhat less than those listed above, for example, on the order of 4 and 7 mils.

The leading edge 110 of the media sheet 22 is automatically aligned in a parallel relationship with the Z axis as it is advanced by the handler into a pair of stops 112,112 secured to the surface 20 of the drum 18. The stops act as an abutment against which the leading edge 110 of the media sheet is moved by the rotating action of one or both of the R1, R2 axes drives. The stops 112,112 are positioned so as to create a line which extends parallel to the Z axis to thereby insure correct alignment of the leading edge with it. The stops 112,112 are adapted for sensing proper seating of the leading edge regardless of the type of media being used. In the case of aluminum plate usage, a slight electropotential, on the order of, for example, 15 volts is connected to each of the stops and the circuit is completed through the aluminum base when contact therebetween occurs. In the case where a polymer base plate is used, the stops include a mechanical switch which is activated by the confronting movement of the leading edge against this switch. Once the media is seated against the stops 112,112, vacuum is applied to the drum manifiold drawing the media against the surface 20 to fix its registration.

In addition to insuring registration of the media sheet in a parallel relationship with the Z axis, the drum 18 further includes an axial registration indicator means 114 and is included as part of the drum surface 20. This means includes an elongate photosensor fixed within the drum and is exposed outwardly to the scanning path of the spinner 30 by a slit cut through the skin of the support surface 20. The outermost edge of the sensor is coincident with the leftmost edge 116 of the support surface and extends inwardly therefrom a given distance of about ½ inch. The X axis position of the media on the cassette 63 is laterally inwardly disposed relative to the outer edge 116 of the support surface 20 as shown by the dimension D in FIG. 3. As such, the media handler will advance a given sheet of media onto the support surface such that the lateral side edge 111 of the media sheet will be disposed generally along the indicated line D. However, variations in the placement of the lateral side edge of the sheet material can be tolerated within certain limits, as related to the length of the optical sensors 114. That is, the lateral side edge of 111 of the media sheet 22 will partially cover the sensor 114 and leave exposed the remaining length between that edge and the edge 116 of the support surface 20. This arrangement provides a means by which a soft datum can be electronically determined by the system controller 6 by causing the scanner 30 to project a beam on the surface 20 starting at the outer edge 116 of the support surface 20 and progressing from that edge along the indicated Z axis. In so doing, the controller 6 interrogates the sensor at given time intervals to establish the point along the Z axis where the scan beam is blocked by the media indicating that an edge has been reached. The establishing of this condition signals the start of the pixel clock for the first raster information used by the laser in the scan. It being noted that before this edge interrogating process occurs, the main carriage is moved to the intermediate S3 position to await completion of the scan, but the imaging may begin immediately after edge detection.

Media sheets are sometimes separated from one another within the cassette 63 by a thin paper interleaf sheet which prevents scratching of the emulsion layer by the plate situated above it. Thus, these paper sheets must be removed automatically by the media handler and discarded prior to advancement of the underlying media sheet onto the drum 18. To these ends, a paper discharge means 120 is provided at the entrance end of the frame 14 and extends generally transversely to the advancement direction S for receiving paper and discarding it in a bin disposed below it. This means includes an upper roller 122 and a lower roller 124, a continuously operating drive motor 126 and a gear drive 128 drivingly connecting the two rollers to one another such that the two rollers counter rotate relative to one another. The upper roller is journalled within generally vertically oriented slots 132,132 which allow the upper roller to be slightly displaced by the material sheet that is gripped by the otherwise counterrotating roller pair. To aid in the gripping process the rollers are provided with a plurality of resilient annular gripping members 134,134.

Figure 8A:
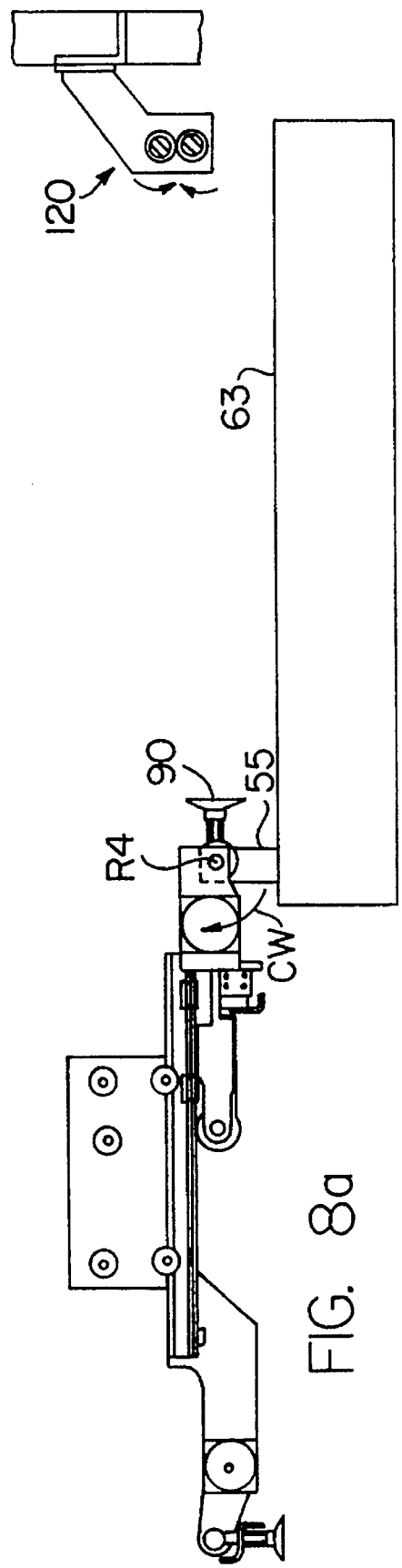
FIGS. 8a and 8b illustrate schematically the automated paper interleaf removal process.
Figure 8B:
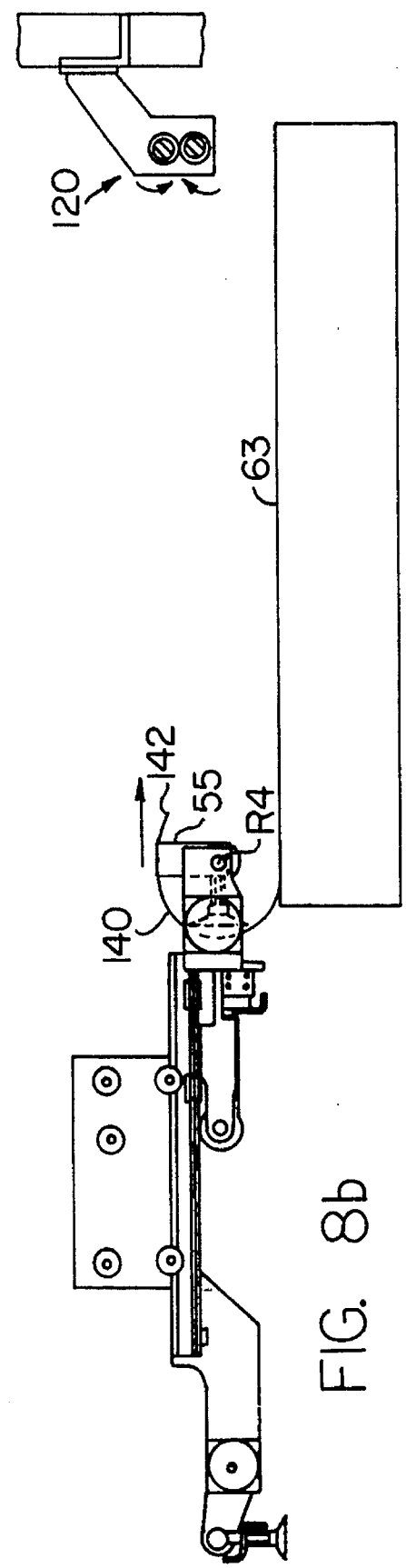

The process of removing a paper interleaf as ilustrated in FIGS. 8a and 8b is first accomplished by rotating the second pick up bar 55 such that its back face is facing downward toward the media cassette below it so as to dispose the vacuum holes 92 in confrontation with the interleaf paper sheet 140 and then introducing a vacuum source to these openings. This juxtaposition causes the drawing up of the interleaf sheet into engagement with the second pick up bar 55 where upon as illustrated in FIG. 8b, the bar is thereafter rotated about the R4 axis to direct the leading end portion 142 of the paper leaf toward the paper discharge means 120. Simultaneously with this rotation, the second pick up bar 55 is advanced toward the position that it assumes at the S1 position illustrated in FIG. 6 so as to feed the leading edge portion 142 into the counter rotating rollers of discharge means 120 whereupon the vacuum applied to the bar is turned off to allow the paper to be released to the discharge means 120.

A second discharge means 152 is also provided and is mounted to the frame 14 along one side of the apparatus immediately adjacent the opening 1 and coincidentally with the intermediate S3 position for the purpose of discharging an exposed media sheet 22 onto, for example, a conveyor for developing. To aid in this process, an articulated slide means 154 is also provided and is pivotally mounted on the frame 14 for sliding the exposed media sheet toward the discharge means 152 under gravity, and thereafter through the opening 1. The discharge means 152 is identical to the device described with respect to the means 120, except that the length of the counter rotating rollers are shorter than those used in the first discharge means since they receive the shorter X coordinate direction dimension of the sheet than the longer Y coordinate dimension as in the case with the discharge means 120.

Figure 9:
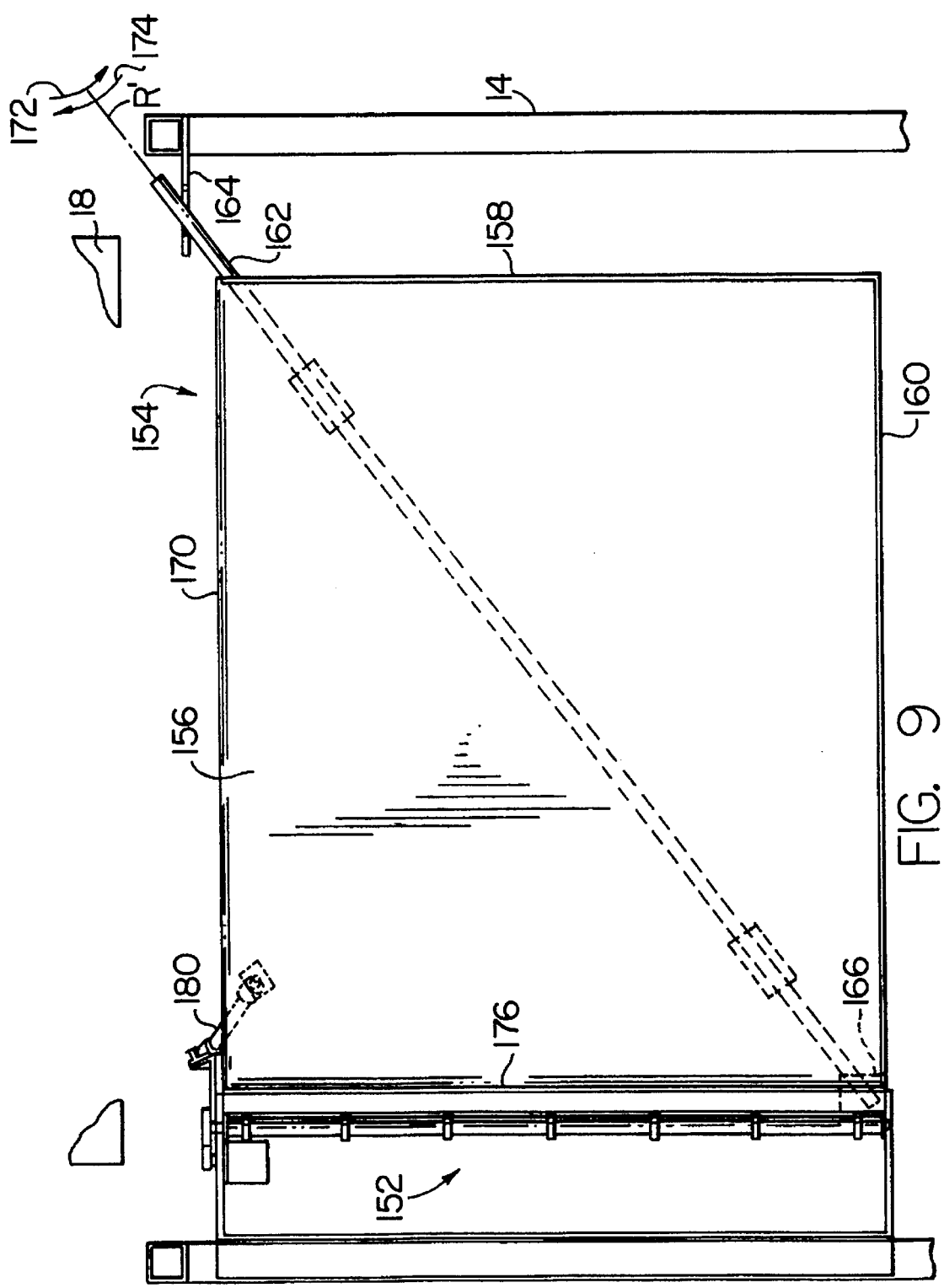
FIG. 9 is a top plan view of the slide tray means.
Figure 10:
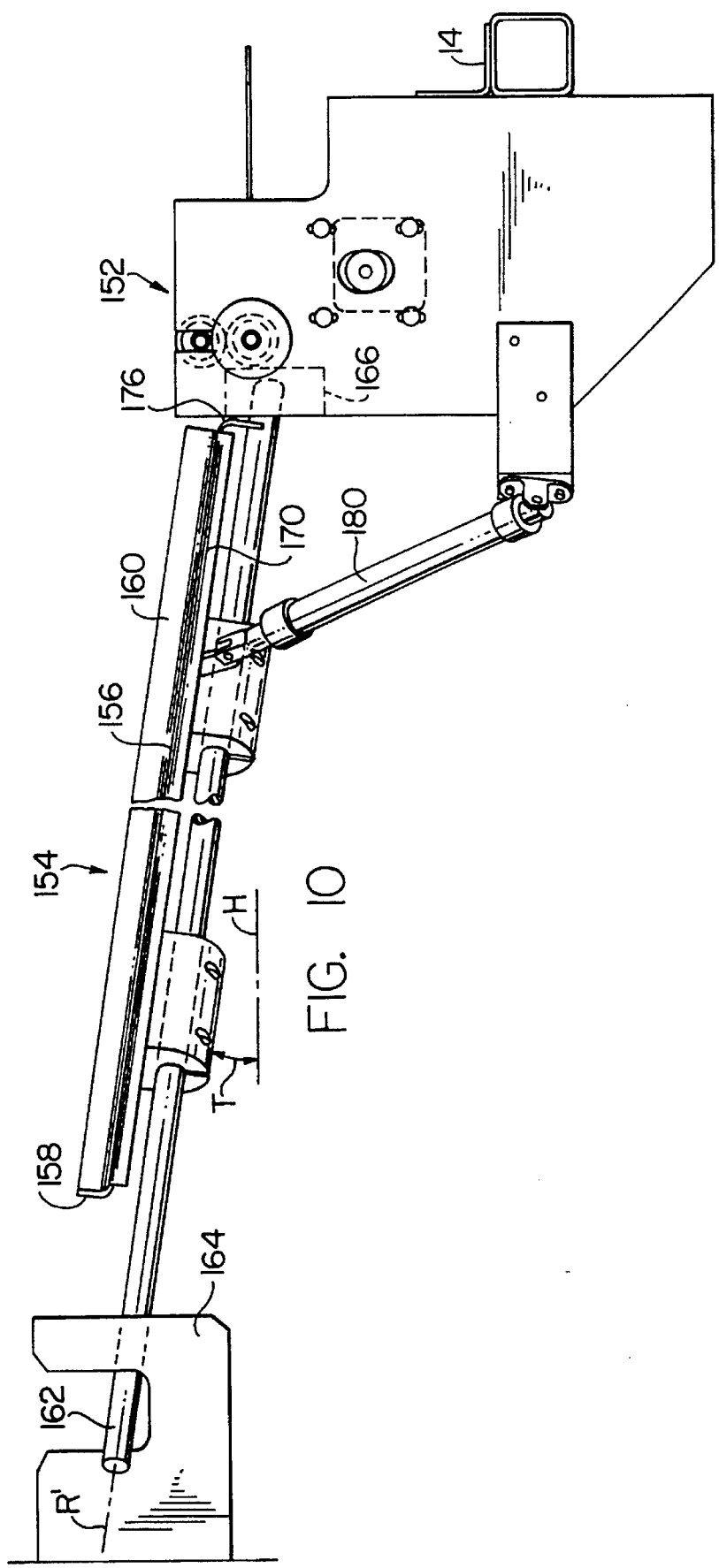
FIG. 10 is a side elevation view of the slide tray of FIG. 9.
Figure 11:
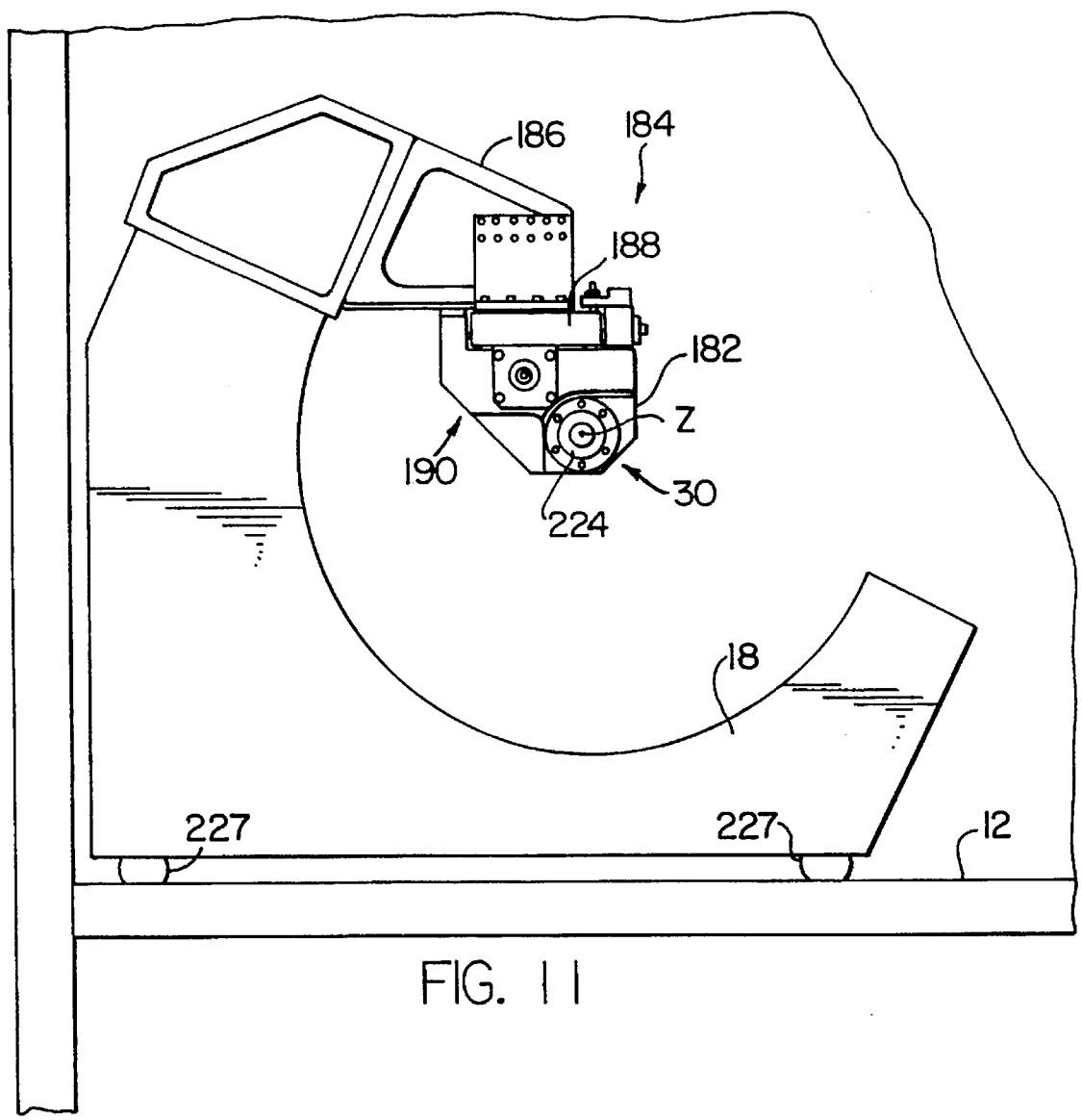
FIG. 11 is a side elevation view of the drum and spinner mirror support system.

As best illustrated in FIGS. 9 and 10, the slide means 154 is comprised of a substantially flat tray 156 having two adjacent sides bordered by upstanding sidewalls 158 and 160. A pivot rod 162 is connected across the bottom of the tray 156 along the diagonal and is supported at its opposite distal ends on the frame 14 within cradles 164 and 166 which allow the rod and the tray to be freely rotatably mounted to the frame for rotation about the illustrated axis R'. The lower cradle 166 is disposed vertically lower than the other cradle 164 such that the axis R' not only extents diagonally across the frame 14 but is also oriented at an angle T relative to a horizontal plane H. In this way, the tray assumes a first inclination wherein the surface of the tray slopes downwardly from its front edge 170 when it is rotated about the axis R' in the indicated direction 172, and assumes a second inclination when rotated in the opposite direction 174 in which orientation the lateral side edge 176 of the tray is located immediately adjacent the rollers of the second discharge means 152. To controllably position the tray in this manner, a double acting actuator 180 is provided and is attached between the leftmost corner of the tray and the frame 14 for this purpose. The actuator is energized between the extended and retracted positions by a solenoid control valve which is inturn controlled by the system controller 6.

To effect removal and subsequent discharge of an exposed media sheet from the drum surface 20, the main carriage and the secondary carriage are advanced to the S2 position from the parked S3 location such that the suction grippers 62 and 90 are positioned immediately adjacent the upper surface of the exposed media which is supported on the drum generally at the same locations assumed in the delivery process. The vacuum applied to the drum 18 is continued until the suction grippers have been oriented in this manner. At that time, vacuum to the suction grippers 62,62 and 90,90 is applied while simultaneously, the negative pressure to the drum is reversed, such that the media sheet is forced away from the drum support surface 20 by the floating action of the airbed created by the reverse airflow. This reverse action in combination with the applied vacuum to the suction gripper elements causes the exposed media sheet to again be gripped by the handler. A reversal of movements in the R1, R2, R3, and R4 axes is effected to remove the involved media sheet from the drum and again create a generally planar media configuration. The main carriage 32 is then stopped at the S3 position where vacuum to the suction grippers is shut off and the media sheet falls into the tray and is stopped from further downward travel by one or both of the end walls 158 and 160. It is noted that all during this process, the actuator 180 is energized to its extended condition so that the tray assumes its inclination sloping toward the bay 65. After a given interval, the system controller 6 reverse energizes the actuator 180 causing the tray to be tilted toward the discharge means 152 such that the media slides towards the counter rotating rollers of the means under its own momentum and thereafter is advanced out of the media handler. The main carriage once dropping the media sheet onto the tray, then moves to its home or S1 position to repeat the handling process.

Referring now to FIGS. 11, 12, 13 and 14, and in particular to the assembly for supporting the spinner assembly 30 for movement along the Z axis, it should be seen that the spinner assembly 30 is effectively suspended in space by a support system 184 which is secured against movement along one side edge of the drum. This support system includes an overhang block 186 on which is fixedly supported a highly smooth rectangular spinner way 188 extending parallel to the central axis Z, a spinner carriage 182 traveling along the way 188 and a positioning means 190 drivingly interposed between the carriage 182 and the way 188 for controllably positioning the carriage at highly defined increments along the Z axis. The spinner assembly 30 carried by the carriage 182 is comprised of a spinner motor 224, a parabolic mirror 226 having a geometric center coincident with the illustrated Z axis, and an encoder 228 for sensing rotational increments of the motor and translating the same into pulse signals to be used by the system controller.

Figure 13:
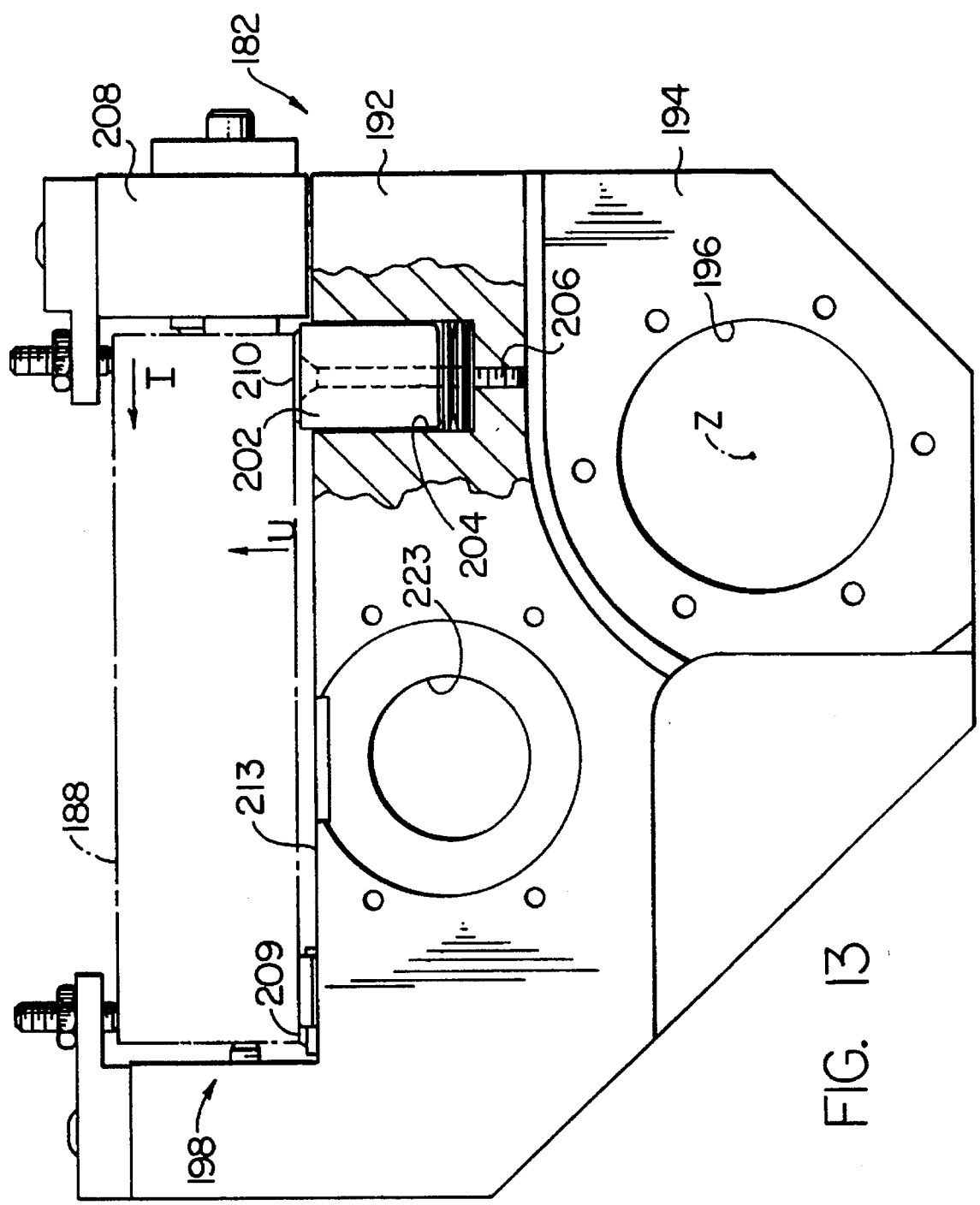
FIG. 13 is a side elevation view of the spinner assembly carriage shown without the spinner motor or a lead screw drive nut.

The spinner carriage 182 as best illustrated in FIGS. 13 and 14 comprises a base member 192 and an integrally connected mounting flange 194 depending from the base member 192. The mounting flange 194 has an appropriate opening 196 formed in it for securing the spinner axis motor 224 to the carriage. The base member 192 as illustrated in FIG. 13 has in vertical cross-section a generally U-shaped top portion 198 which is sized and shaped to receive the correspondingly sized and shaped way 188 therein and is defined by a frontal wall portion 208 and a bottom surface 213. The base member 192 is also provided with a plurality of magnetic bearings 202,202 housed within blind bores formed therein. Each of the magnetic bearings 202,202 is secured within its respective bore 204 by an appropriate securement means, such as the threaded screw 206. The plurality of magnetic bearings provide a slide bearing surface 209 and 210 disposed along opposite sides of the bottom surface 213 of the U-shaped portion 198 to draw the base member 192 upwardly into engagement with the metallic way 188. Similarly, the frontal upstanding wall 208 of the U-shaped portion is provided with a plurality of like metallic bearing members 208 which are secured within the wall in the same manner as those discussed with reference to the bearings 202,202. The combined actions of the frontal wall bearings and the bottom surface bearings causes the carriage to be drawn into contact with the way in the indicated $\underline{U}$ direction as well as being laterally held in contact with the way in the indicated $\underline{I}$ direction so as to create a non-interrupted engagement between the carriage 182 and the way on which it travels.

Figure 12:
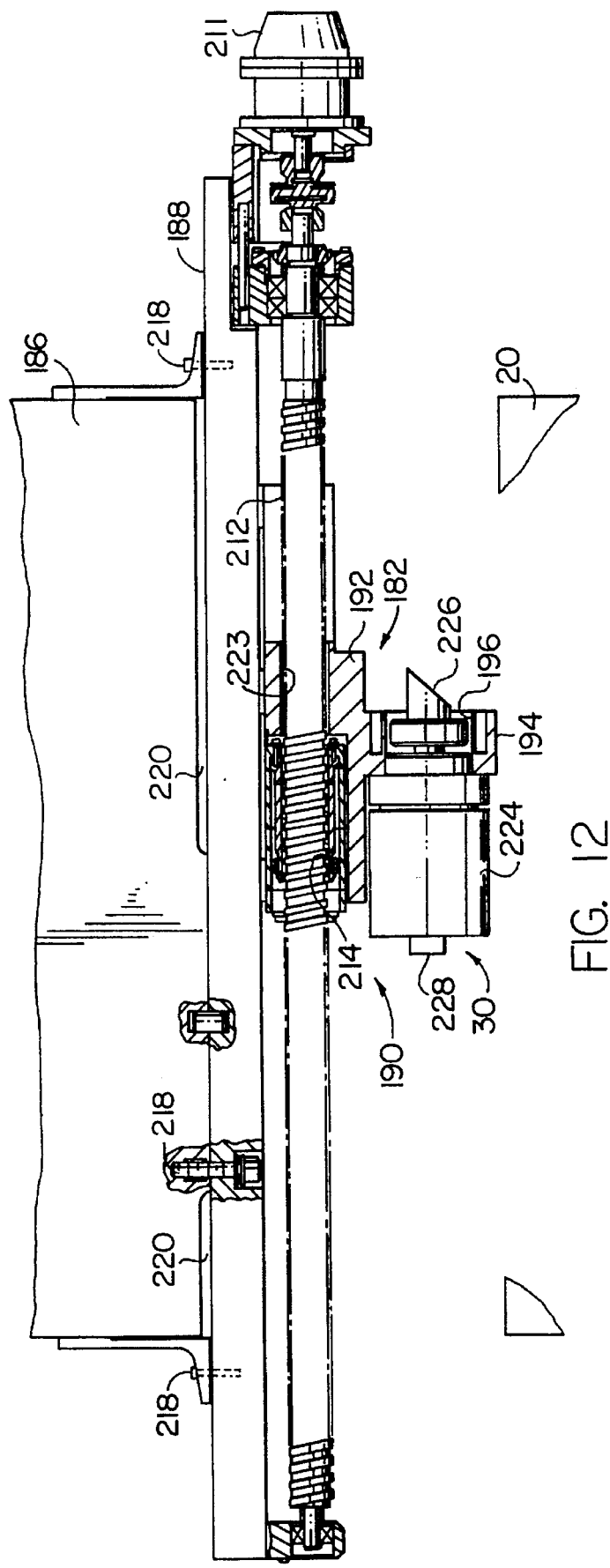
FIG. 12 is a partially fragmentary front elevation view of the spinner positioning system.

The spinner carriage 182 is slid against the otherwise holding forces created by the plurality of magnetic bearings 202,202 and 208,208 under the controlled linear positioning force of the positioning means 190. This means as best illustrated in FIG. 12 includes a stepper drive motor 211 secured against movement to the way 188, a precision five pitch lead screw 212 extending parallel to the central Z axis and driven in rotation by the drive motor 211 through the intermediary of a 1 to 10 gear reduction box, and a drive nut means 214 interposed between the carriage 182 and the lead screw 212 for converting the otherwise rotational movement delivered by the stepper motor 211 into linear positioning movement. It is a feature of the invention to provide the lead screw with a given length that exceeds the width of the drum surface 20 so as to provide ample residual length for parking the carriage out of interference with the movement of the media handler sub-carriage 34 as it advances a media sheet onto the drum in the manner shown in FIG. 6. In this way, the necessity to return the spinner carriage to a home location before advancement of media is avoided and therefore throughput in the system is increased. The drive nut 214 is secured against movement to the base member 192 of the spinner carriage through the mounting flange and extends concentrically with a through opening 223 formed therein.

The way 188 is secured to the overhang block 186 through the intermediary of connecting screws 218,218 such that the confronting surfaces of the way and the block are pressed together with one another. In order to reduce the affects of relative thermal expansions between the way and the overhang block as heat is produced during the scanning process, inwardly directed cuts 220,220 are formed in the overhang block and extend generally parallel to the indicated Z axis for the purpose of spacing a portion of the length of the overhang block surface from contacting engagement with the way.

The plotting drum 18 is supported on the frame 12 on four load bearing floating supports 227,227 located at the four corners of the rectangular base footprint of the plotter drum. Each of the floating supports 228,228 is connected to a pressurized air source and are in essence acting as one way actuators which when energized caused the drum to raise from its otherwise lowered hard support condition on the frame 12. In its lowered condition, when the floating supports are not energized, the weight of the drum rests on hard stops which make up part of each support thereby ensuring repeatability in the handling of media onto and off of the drum support surface 20. However, during a plotting operation, pressurized air is introduced to each of the floating supports 227,227 so as to support the drum on a cushion of air. This arrangement aids in the dampening of vibrations otherwise transmitted to the scanning apparatus from other powered sources. Further to these ends, the laser 26 and the light redirecting mirror 28 are both supported by and connected to the drum 18 so as to be subjected to like vibrations and other external effects acting on the drum.

Figure 16:
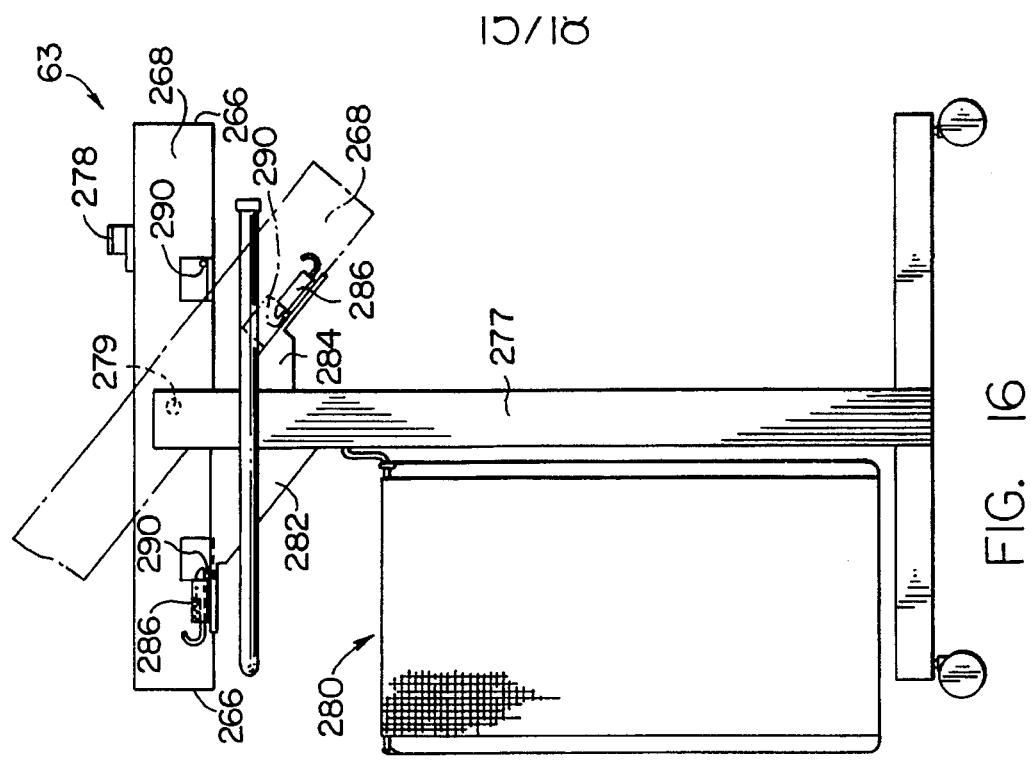
FIG. 16 is a side elevation view of the assembly shown in FIG. 15.
Figure 15:
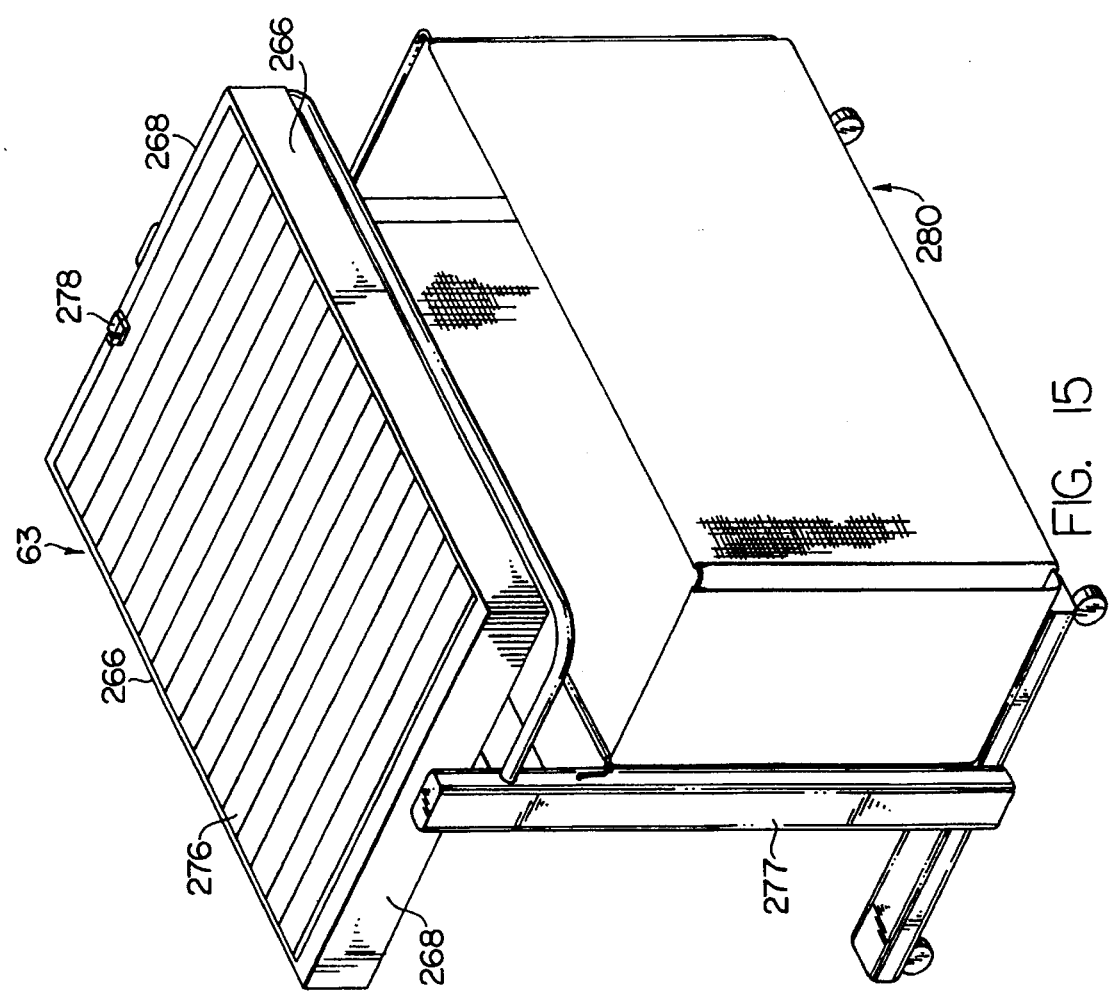
FIG. 15 is a perspective view of a cassette and cassette dolly assembly.

Referring now to FIGS. 15 and 16, a cassette and cassette dolly assembly is illustrated in perspective view and shown as it would be rolled in the bay 65 of the media handler in the indicated S direction. The cassette 63 is of a generally rectangular shape having short sides 268,268 and long sides 266,266, the long sides of which extend parallel to the indicated Y coordinate direction and the short sides of which extend parallel to the indicated X coordinate direction when the assembly is rolled into position into the bay 65. As best illustrated in FIG. 3, the handler frame 14 includes a bumper 270 resiliently mounted on the frame so as to yieldably guide one of the short sides 268,268 into lateral registration with a fixed guide 272 disposed on the opposite side of the frame 14 so as to justify the cassette with reference to the indicated X coordinate direction. Justification of the cassette along the Y coordinate axis is effected by magnetic stop members 274,274 which are fixed to the frame 14 and are so positioned thereon as to engage with the leading side face 266 of the cassette.

The cassette further includes a roll top or tambour cover 276 having a projection 278 which is positioned in line with the depending hook 108 of the slide actuator 106 carried by the secondary carriage 34. The depending hook 108 is located at an end of travel position such that it is capable of engaging the projection 278 as it is moved to its opposite end of travel and therefore open the cover automatically once doors 3,3 are closed to affect opening in the light tight environment of the apparatus.

The dolly also carries a basket 280 which extends rearwardly beyond the rear long side 266 of the cassette so as to catch the paper interleaves which are discharged through the means 120. The dolly also supports the cassette 63 on two upstanding frame members in a substantially flat operating condition as illustrated in FIG. 16. The cassette is pivotally mounted to each of the frame members 277,277 through an appropriate pivot connection 279. A first abutment stop 282 is provided on one side of the frame members 277,277 for the purpose of maintaining the cassette in its normal operating flat condition, but includes a second abutment stop 284 for allowing limited tilting of the cassette about the pivot connections 279 in order to effect easier loading of media. Sliding latch means 286,286 are provided on respective abutment stops 282 and 284 for the purpose of cooperating with locking pins 290,290 disposed on the cassette to hold the cassette in either of these orientations.

Figure 17:
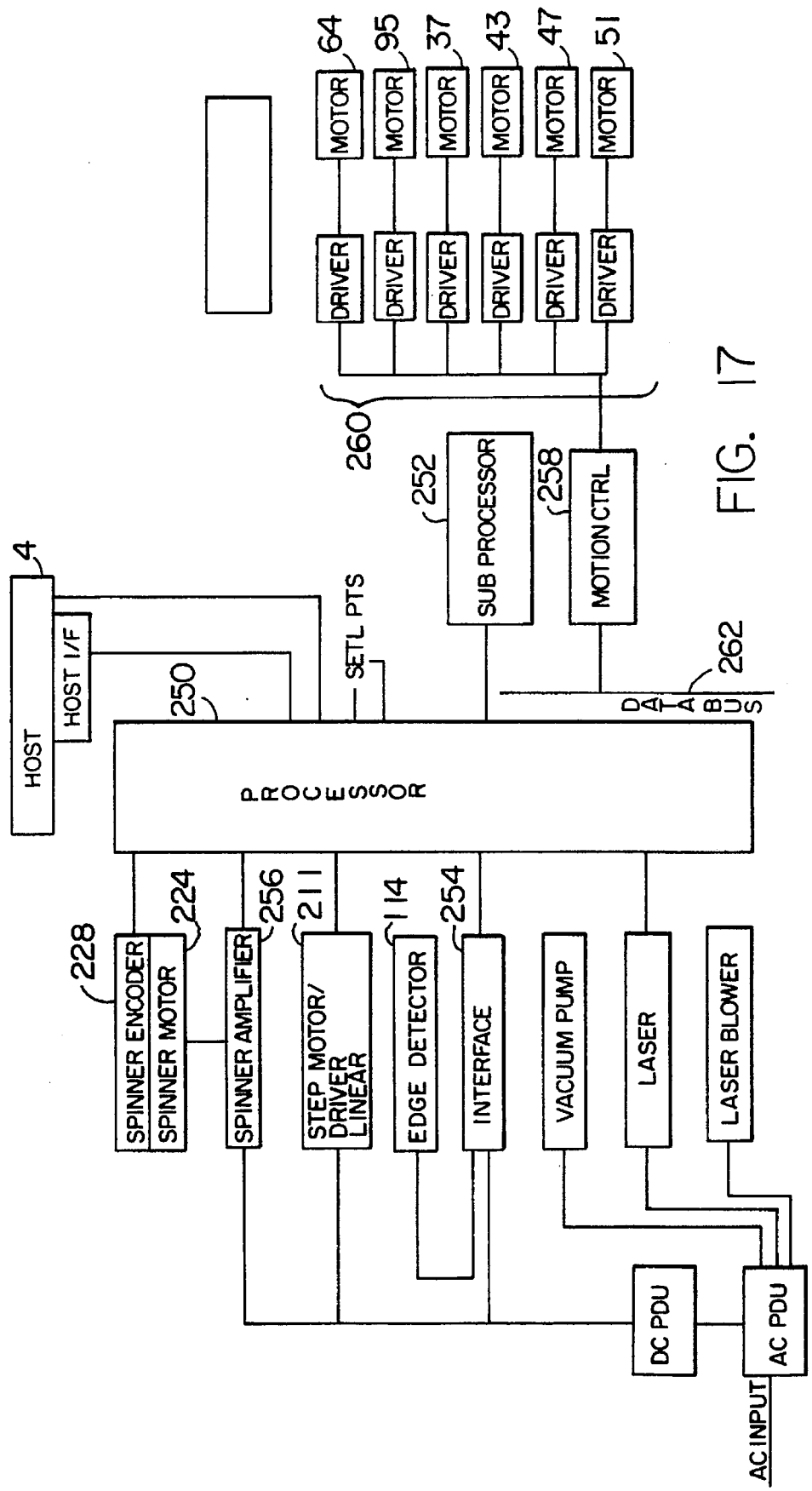
FIG. 17 is a schematic of the general system controller for the apparatus.

Referring now to FIG. 17 and to the general scheme of the system controller 6, it should be seen that the system includes a main central processing unit 250 which, for example, may be a MOTOROLA 68000 processor, a subprocessor 252 dedicated to controlling the movements of the media handler 10 and an interface 254 dedicated to controlling more specific operations of the photoplotter 12. The main processor controls the speed of the spinner motor 224 through an appropriate spinner amplifier 256 to ensure a constant spin rate is achieved. The main processor likewise also drives the step motor 211 of the linear drive in accordance with the scheme discussed in FIGS. 18 as well as controlling the clocking of pixel information used by the laser to generate a scannned image. The subprocessor 252 controls the handler drive axes motors and the linear drive motors through the intermediary of a bank of drivers 260 which are inturn controlled by a motion control board 258 linked to the sub-controller 252 through an appropriate databus 262. The interface 254 is, among other things, responsible for interrogating the edge detector 114 to determine the soft datum used to begin a plotting operation as discussed above.

It is a feature of the invention to vary the spot diameter with the required resolution. For example, the system is capable of scanning in four modes of resolution at 3810 dots per inch, 2540 dots per inch, 1270 per inch, and 1905 dots per inch. Accordingly spot diameters are varied with the resolution change as follows:

| RESOLUTION | SPOT SIZE |
| --- | --- |
| 3810 | 8 microns |
| 2540 | 10 microns |
| 1905 | 15 microns |
| 1270 | 20 microns |

The second sub-controller 254 is also responsible for the selection of dot sizes in accordance with the resolution requirement set forth as a parameter of the scan. This can be accomplished in two ways, the first is by using a laser to generate a beam of a fixed diameter and thereafter causing the beam to be passed through a selected lens to either reduce or increase a given size diameter. Alternatively, the laser can itself have the capability of creating a beam with variable diameters which can be directly controlled by instructions issued from the sub-controller 254. One such laser is produced by a Special Optics Inc. of Little Falls, N.J., under Model No. 56-30-2-8X and sold under the trade name Variable Zoom Beam Expander.

Figure 18:
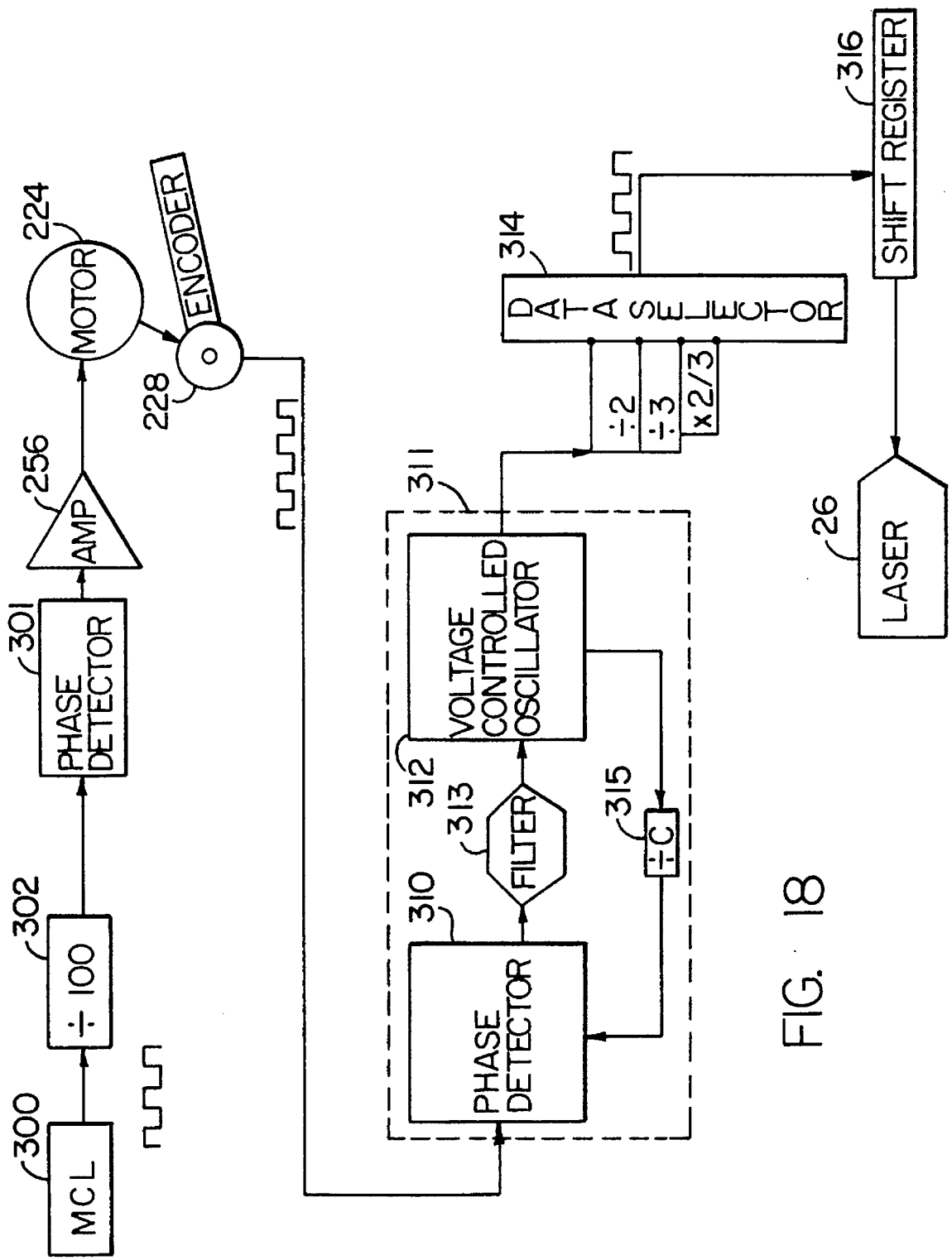
FIG. 18 is a schematic showing a pixel clock driver.
Figure 19:
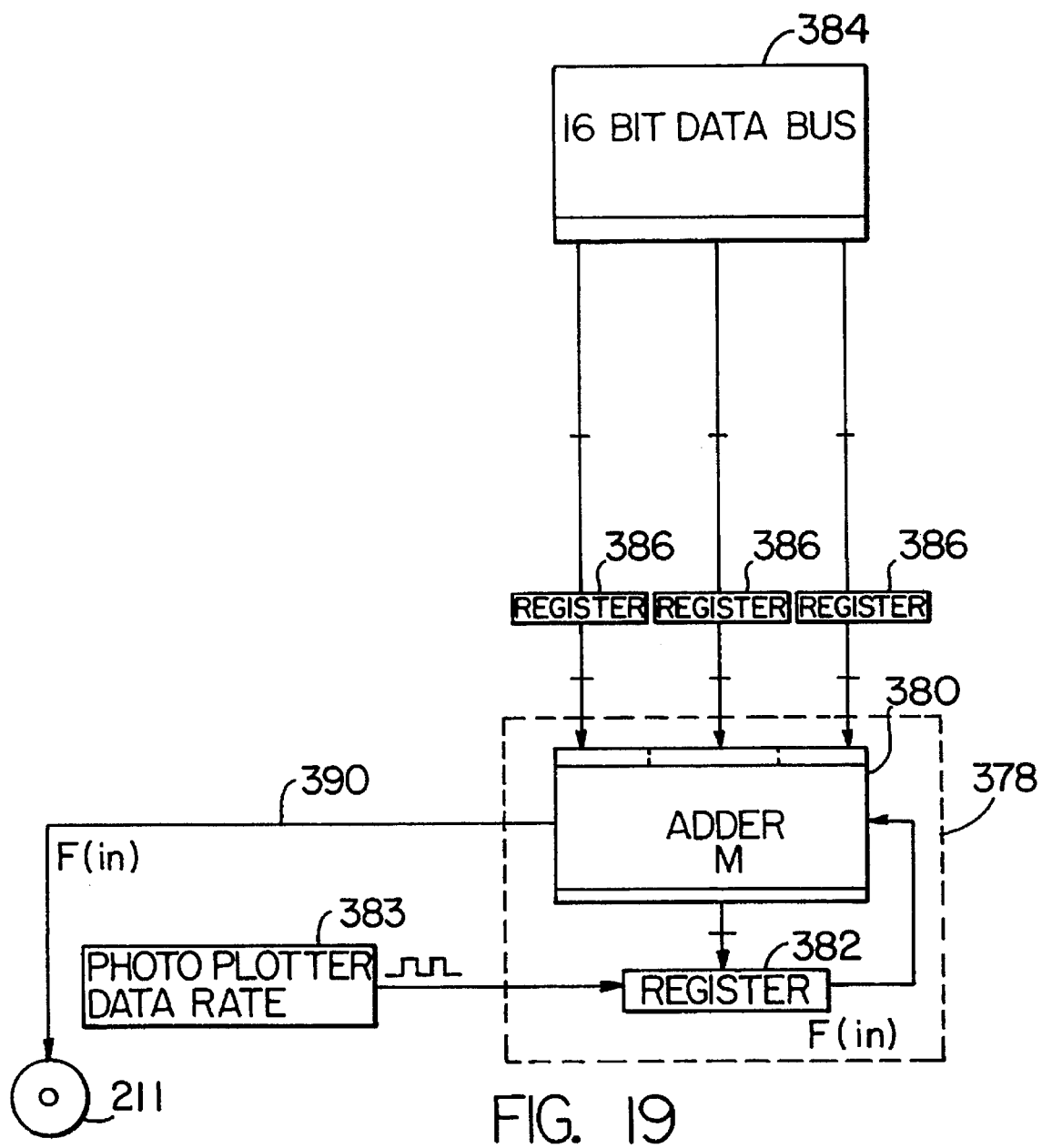
FIG. 19 is a schematic showing a linear positioning system driver.

Referring now to FIGS. 18 and 19, a scheme is shown for creating a frequency by which pixel information is clocked to the laser from the host computer 4 and for creating a driving frequency for driving the lead screw drive motor 211 which rate corresponds to the end of one raster line and the beginning of the next successive line. As illustrated in FIG. 18, it should be seen that the pixel clock frequency is derived from the output of the spinner encoder 228 which is used as the reference clock. The spinner encoder also has an angular positioning detector which is used by the controller 6 as an indicator as to when to begin a scan line for a given raster. However, because the encoder is broken down only into 1000 increments per revolution, a much higher resolution is needed for driving the LASAR pixel information. Thus, the output frequency of the encoder is fed into a phase lock loop 311 to increase the pulse resolution by a multiple of a determined constant $\underline{C}$ based on the maximum print resolution of the system and which output frquency is thereafter divided down by a data selector 314 to support the remaining resolutions.

Since the system utilizes the output of the spinner as its reference clock, a means is provided for running the spinner motor 224 precisely at a desired velocity. This means includes providing a main clock 300 having a clock rate of 20 megahertz which is divided by appropriate circuitry at 302 to create a 20 kilohertz rate and passed through a phase detector 301. The phase differential is filtered and is then inputted into the servo-amplifier 256 which drives the motor 224 and controls the spin rate of the spinner motor 224 so as to maintain this rate at a constant angular velocity. As mentioned, the system is capable of scanning with various resolutions and accordingly scans at each resolution are driven at a different frequency as follows:

| Resolution (DIP) | Data Rate (MHz) |
|---|---|
| 3810 | 54.8 |
| 2540 | 36.6 |
| 1905 | 27.40 |
| 1270 | 18.30 |

The velocity of the spinner motor is selected so as to independently support the highest resolution listed above. That is, the spinner motor 224 rotates at a velocity of 200 revolutions per second so that a frequency of 200 kilohertz is created and inputted to phase lock loop 311 based on 200 (rev/sec)×1000 (pulses/rev) to support the highest resolution. Notwithstanding, it is a feature of the invention to provide a muliple speed mirror that may generate a faster reference clock for certain applications. That is, the data rate of 54.8 MHz for the 3810 dpi resolution is an upper limit on clock generation and inturn sets the scan rate at 200 scans per second. However, the data rates at 1120 dpi, 1905 dpi and 2540 dpi are substantially lower so that a scan rate of 300 scans per second or a mirror velocity of the same may be used. This is desireable since at the higher rate, imaging time is decreased.

The phase lock loop 311 is comprised of a phase detector 310 a low pass filter 313 and a voltage controlled oscillator 312 whose output is fed into the data selector 314. The phase detector generates an output signal which is either positive or negative depending upon whether there is a phase lag or phase lead detected. The low pass filter 313 filters out any noise or stray signals from the voltage controlled oscillator 312 which creates the output frequency used as the pixel clock. A digital counter 315 is provided to feed back the output frequency of the oscillator to the phase detector and to divide it down by the constant $\underline{C}$. The phase detector locks phase between the input signal which is the input from the rotary encoder 228 and the divided down frequency signal.

The output of the voltage control oscillator is inputted into the data selector or multiplexer 314 whose output frequency ultimately controls the clocking of pixel information through a shift registration 316 used by the laser 26. As mentioned, the pixel output rate is variable depending on the resolution sought for a given scan and therefore the data selector is capable of altering the input frequency for each resolution selected with the exception of the 3810 resolution. This is done by dividing the input frequency by (2) in the case where a 1905 resolution is required or by dividing the input frequency by (3) in the case where a 1270 resolution is required and multiplying the input frequency by two-thirds (⅔) in the case where a 2540 resolution is sought.

Referring now to FIG. 19 and to the system for controlling the linear drive stepper motor 211, it should be seen that this system is comprised of a differential data accumulator 378 which includes an adder 380 the output of which is fed to a clocked register 382. The adder is comprised of a 42 bit accumulator having in essence two inputs and an output 390 which drives the stepper motor 211. The first input is the output of the register 382 which is clocked at 383 the frequency or data rate corresponding to the highest print resolution and remains the clock rate despite whatever different resolution setting is selected. The second input to the accumulator is taken off a databus 384 and fed through three separate registers 386,386,386 which input to the accumulator a constant $\underline{N}$. This constant can be changed as a system parameter and is used to vary the frequency which drives the stepper motor 210. As an example of how the accummulator works, the system includes a 16 bit databus on which is placed the constant N which is subsequently loaded into the three separate registers 386,386,386 each being of 16 bit size. Given that a 42 bit accumulator is used, the output 390 of the accumulator will be defined by the following equasion:

$$F(\text{out}) = \frac{F(\text{in}) \times N}{2^{42}}$$

The constant number $\underline{N}$ is feed into one input of the adder, and the second input to the adder is the last result in the accumulator. When the register is clocked a new sum is now shifted into the accumulator and that in turn is added again to the constant N. The value added to the accumulator is less than 1 and any carry over of this from the accumulator is the result of successive additions to that same value such that the summated value will eventually exceed unity. Thus, the frequency out F(out) is equal to the frequency in F(in) multiplied by the constant $\underline{N}$ so that if $\underline{N}$ is a number equal to 240, then the frequency out F(out) at 390 would be equal to one-quarter the frequency in F(in). This overflow signal is thus used to drive the leadscrew motor 211.

By the foregoing, a photoplotter and media handler have been described in its preferred embodiment. However, numerous modifications and substitutions can be had without parting from the spirit of the invention. For example, in order to generate greater resolution in the referenece clock established by the spinner motor 224, spinner motor velocity can be increased to effect higher throughput in the machine. Finally, as discussed in the preferred embodiment, the drive motors used in the apparatus have been set forth as being stepper type motors. However, it is well within the purview of the invention to drive the driven parts with servo-controlled motors to effect the same ends.

Accordingly, the invention has been described by way of example rather than limitation.

We claim:
1. An apparatus comprising;
    a frame;

a drum supported on said frame and having a partially cylindric internal support surface extending along and facing toward a central axis and having a given radius of curvature taken from the central axis;

a scanning means supported by said frame and juxtaposed relative to said internal support surface so as to cause a light beam to sweep a path across the support surface;

means for holding a media sheet on said support surface during a scanning operation in registration with at least one reference axis;

a supply means defined by said frame for receiving a supply of media sheets and maintaining said supply of media sheets in a given orientation with respect to said at least one reference axis; and transport means extending between said drum and said supply means for lifting a media sheet from said supply means and for advancing it toward and placing it onto said support surface where a scanning operation is conducted and for removing said media sheet from the support surface after a scanning operation is completed on the involved media sheet;

said supply means being so constructed as to maintain said sheets of media in a substantially flat condition and said transport means including sheet gripping means which travels with the transported media sheet from said supply means to said drum for lifting the transported media sheet from said supply in a substantially flat condition, for then bending said transported media sheet to a partially cylindric configuration conforming generally to said internal support surface of said drum, and for thereafter placing said transported media sheet onto said support surface while said transported media sheet is held in said partially cylindric configuration and is moved in a direction generally normal to and toward said support surface.

2. An apparatus as defined in claim 1 further characterized in that said transport means includes a main carriage disposed for movement relative to said frame along a line of action extending generally orthogonally to the central axis of the drum and having a drive means for controllably positioning the main carriage along said line of action; and wherein said main carriage includes a secondary carriage supported by and moveable relative to the main carriage parallel to said line of action, said sheet gripping means being so associated with said main carriage and with said secondary carriage that relative movement between the main carriage and the secondary carriage accompanies the bending of said transported media sheet to said partially cylindric configuration.

3. An apparatus as defined in claim 2 further characterized by said sheet gripping means including a first suction gripper means carried by said main carriage and extending generally parallel to the central axis of said drum and a second suction gripper means carried by said secondary carriage and extending substantially parallel to said central axis of said drum; and wherein each of said first and second gripper means is rotatably controllably mounted respectively to said main carriage and to said secondary carriage for movement about respective second and fourth axes relative to said main and secondary carriage respectively, which second and fourth axes are parallel to said central axis of said drum.

4. An apparatus as defined in claim 3 further characterized in that said first gripper means is rotatably connected to said main carriage through the intermediary of two controllable pivot connections such that said first gripper means is controllably rotated about a first axis and said second axis, and said second gripper means is rotatably connected to said secondary carriage through the intermediary of two pivot connections such that said second gripper means is controllably rotated about a third axis and said fourth axis, said first and third axes being parallel to said central axis of said drum.

5. An apparatus as defined in claim 4 further characterized in that said secondary carriage includes a slide mechanism disposed generally parallel to the central axis of said drum;

said means for holding a supply of media sheets is a cassette having a body for holding said supply of media sheets, said body having an open top, and a cover associated with said body and movable relative to said body between open and closed positions in relation to said open top, and said slide mechanism includes a depending projection which is movable generally parallel to said central axis of said drum and is engagable with said cover of said cassette to move said cover between said open and closed positions in response to said movement of said projection.

6. An apparatus as defined in claim 5 further characterized in that the depending projection is normally located at one end of the slide mechanism.

7. An apparatus as defined in claim 5 further characterized in that said main carriage drive means includes a rack and pinion drive wherein the rack is mounted to the frame along oppposing sides thereof and extending orthogonally to the central axis of said drum; and wherein the rack is engaged by pinion drives extending outwardly of the first carriage and engaging within teeth disposed on the rack.

8. An apparatus as defined in claim 7 further characterized in that said secondary carriage and said main carriage are connected to one another through the intermediary of a way which is secured to the main carriage and extends perpendicular to said central axis; and wherein said secondary carriage includes a drive means comprised of a drive nut and lead screw and a plurality of guide rollers engagable on said way; and wherein said lead screw is rotatably connected to the way.

9. An apparatus as defined in claim 8 further characterized in that said drum is supported on four spaced apart floating supports which are air driven between an extended position and a retracted position coinciding respectively to the condition where a scanning operation is being conducted on the media and the condition where a media sheet is being loaded onto the support surface.

10. An apparatus as defined in claim 1 further characterized in that said scanning means includes a rotating light redirecting mirror mounted for rotation about said drum central axis and for linear movement along a way disposed a said drum parallel to said central axis of said drum; and wherein said rotating light redirecting mirror is rotated coincidentally with said central axis at high speeds by an electric spinner motor.

11. An apparatus as defined in claim 10 further characterized in that said spinner motor is carried by a spinner carriage suspended above said drum such that the rotating light redirecting mirror is suspended in space; and wherein said spinner carriage travels along a spinner way extending parallel to said central axis and said spinner way is suspended above said drum surface by an overhang block fixed to said drum.

12. An apparatus as defined in claim 11 further characterized in that said spinner carriage is linearly driven by a spinner axis positioning means comprising a lead screw and a drive nut assembly wherein the drive nut is secured against movement to the carriage and the lead screw is rotatably supported at opposite ends of said way.

13. An apparatus as defined in claim 12 further characterized in that said lead screw has opposite ends which define its length and is driven by a stepper motor and has a given length which is greater than the length of the support surface as measured along said central axis whereby the spinner carriage can be parked at opposite ends of the lead screw without interfering with the activity of said transport means in placing a media sheet onto and in removing a media sheet from said support surface.

14. An apparatus as defined in claim 13 further characterized in that said overhang block has inwardly directed cuts formed on its inner face opposing the spinner way so as to limit thermal stresses between the overhang block and the spinner way occurring as the result of heat generated by the scanning operation.

15. An apparatus as defined in claim 4, further characterized in that said second gripper means includes an elongate bar having a plurality of vacuum openings formed along one side face, said elongate bar being capable of rotating about said fourth axis so as to permit said vacuum openings to be placed in confrontation with an interleaf sheet of paper contained in the media supply means and to allow said bar to be thereafter rotated to draw the interleaf sheet from said media supply means.

16. An apparatus as defined in claim 15 further characterized in that disposed at one end of said frame opposite of the location of the drum is a first discharge means for receiving the paper interleaf drawn away by said second gripper means and for discharging the interleaf downwardly to a receptacle.

17. An apparatus as defined in claim 16 further characterized in that said first discharge means includes a first drive roller extending across said frame generally parallel to said drum central axis and a second roller disposed above said first roller and being rotatably journalled in a generally vertically extending slot; and wherein the first and second rollers are counter rotatably driven by an appropriate gear drive system.

18. An apparatus as defined in claim 1 further characterized in that said transport means is positionable at an intermediate station intermediate said supply means and said drum, said intermediate station including a second discharge means and a slide tray means with a slide tray movable between two positions relative to said frame.

19. An apparatus as defined in claim 18 further characterized in that said slide tray is pivotally mounted on a bar with a longitudinal axis which bar is connected to said slide tray along the underside thereof and along a diagonal thereof, said bar being received within upper and lower cradles secured to said frame, said two positions of said tray being two positions of said tray about said longitudinal axis of said bar, said tray in one of said two positions having a first inclination directed orthogonally toward said drum central axis and said tray in the other of said two positions having a second inclination directed parallel to said drum central axis.

20. An apparatus as defined in claim 19 further characterized in that said second discharge means includes a first drive roller extending across said frame generally parallel to said drum central axis and a second roller disposed above said first roller and being rotatably journalled in a generally vertically extending slot; and wherein the first and second rollers are counter rotatingly driven by an appropriate gear drive system.

21. An apparatus as defined in claim 5 further characterized by said cassette body having sides which are placed in registration with first and second coordinate axes, said first of said coordinate axes extending parallel to said drum central axis and said second of said coordinate axes extending orthogonally to said drum central axis.

22. An apparatus as defined in claim 21 further characterized in that said cassette is light-tight, and in that slide cover is a tambour cover having an upwardly directed projection which is hooked by said depending projection on said slide mechanism.

23. An apparatus as defined in claim 22 further characterized in that said cassette is supported by a moveable dolly having two upstanding frame members which pivotally connect the cassette to the dolly; and wherein said upstanding frame members have two abutment stops one of which stops maintains the cassette in a generally horizontal disposition and the other which stops maintain the cassette in an inclined disposition.

24. As apparatus as defined in claim 9 further characterized in that a laser is mounted to the drum and a light re-directing mirror is located in line with the output of said laser and is also mounted to said drum so that the drum can be independently floated apart from the frame structure to effect dampening of vibrations to the scanner means.

25. An apparatus for moving media in sheet form between a plurality of locations comprising:

a frame;

a support surface having a first given configuration supported by said frame and located at a first location relative to said frame;

means for holding a media sheet on said support surface in registration with at least one reference axis during a work procedure;

supply means located at a second location relative to said frame and remotely of said first location for receiving a supply of media sheets in stack form and for maintaining said supply of media sheets in a given orientation with respect to said at least one reference axis and in a second configuration different from said first given configuration of said support surface; and a transport means extending between said first and second locations for lifting a transported media sheet from said supply of media sheets and for advancing the transported media sheet onto said support surface and for removing said transported media sheet from the support surface after a work operation is completed on said media sheet;

said transport means including sheet gripping means which travels with the transported sheet from the supply means to said drum for lifting the transported media sheet from said supply of media sheets in said second given configuration, for then bending said transported media sheet to a configuration generally matching said first given configuration of said support surface, and for thereafter placing said transported media sheet onto said support surface while said transported media sheet is held in said generally matching configuration and is moved in a direction generally normal to and toward said support surface.

26. An apparatus as defined in claim 1, wherein a media sheet as advanced to said support surface by said transport means has a leading edge generally parallel to said central axis and a lateral side edge perpendicular to said leading edge, and further characterized by:

a controller controlling the operation of said scanning means, said means for holding a media sheet on said support surface in registration with at least one reference axis including a stop means fixed relative to said support surface and engagable with said leading edge of said media sheet to arrest advancement of said media sheet and to thereby align said leading edge with said reference axis, and an edge detector means providing signals to said controller indicating the position of said lateral side edge of said media sheet along said central axis when said media sheet is held on said support surface by said holding means.

27. An apparatus as defined in claim 26 further characterized by:

said scanning means being a raster scanning one wherein a light beam is moved along successive scan lines extending across said support surface and during movement along each scan line is modulated in accordance with pixel information, and said controller being operable to start said modulation of said light beam during movement of said light beam along each scan line in dependence on the position of said lateral edge of said media sheet along said central axis as indicated by said edge detector signals.

28. An apparatus as defined in claim 26, further characterized by:

said stop means being two stops extending outwardly from said support surface at two points spaced from one another along said reference axis.

29. An apparatus as defined in claim 28, further characterized by:

said stop means including means providing a signal to said controller indicating engagement of said leading edge with both of said two stops.

30. An apparatus as defined in claim 26, further characterized by:

said scanning means including means producing a scanning light beam which light beam during a scanning operation is moved angularly about said central axis and axially in one direction along said central axis to trace scan lines extending across said support surface in planes generally perpendicular to said central axis and axially spaced from one another along said central axis with the first scan line of a scanning operation being located outboard of said lateral side edge of a media sheet held to said support surface and with the following scan lines of the scanning operation in succession moving to and then beyond said lateral side edge, and said edge detector means including a receiving element fixed relative to said support surface and extending along a line parallel to said central axis from a point outboard of said lateral side edge of a media sheet held to said support surface to a point inboard of said lateral side edge so that a portion of said receiving element is covered by the media sheet held to said support surface, and means for producing a crossing signal each time said light beam crosses said receiving element whereby the position of said lateral side edge along said central axis is indicated by the position of said light beam along said central axis at the time said media sheet held to said supporting surface first blocks said light beam from reaching said receiving element during the tracing of a scan line and thereby prevents the production of a crossing signal.

31. An apparatus as defined in claim 30, further characterized by:

said receiving element being a photosensor.

32. An apparatus for exposing images on media sheets each having a leading edge and a lateral side edge perpendicular to said leading edge, said apparatus comprising:

a frame;

means carried by said frame providing an exposure station having a support surface for supporting one at a time sheets of media for the optical exposure of images thereon;

a raster scanning mechanism associated with said exposure station for exposing an image on a media sheet supported on said support surface by raster scanning a light beam along successive scan lines extending parallel to one of said edges of said media sheet and controllably modulating the intensity of said light beam as it moves along each of said scan lines;

feeding means for advancing a media sheet onto said support surface of said exposure station;

means for removing a media sheet from said support surface of said exposure station after exposure by said scanning means;

a controller controlling the operation of said scanning means;

a stop means fixed relative to said support surface of said exposure station and engagable with said leading edge of a media sheet as said media sheet is advanced to said support surface by said feeding means to arrest advancement of said media sheet and to thereby align the leading edge of said media sheet with a reference line fixed relative to said support surface;

an edge detector associated with said support surface and providing signals to said controller indicating the position of said lateral side edge of the media sheet supported on said support surface in a direction parallel to said reference line; and means for controlling said raster scanning mechanism in response to said signals indicating the position of said lateral edge of said media sheet so as to position said image a given distance from said lateral edge of said media sheet.

33. An apparatus as defined in claim 1, further characterized by:

means providing a light-tight enclosure for said drum, said scanning means, said means for receiving a supply of media sheets and said transport means, a supply cassette for containing said supply of media sheets and for holding them in flat condition, which supply cassette during operation of said apparatus is held within said light-tight enclosure by said means for receiving a supply of media sheets and is removable from said enclosure and said means for receiving a supply media sheets for re-filling purposes, said supply cassette having a box-like body and a cover movable between opened and closed positions relative to said body, and means for moving said cover of said supply cassette from said closed position to said open position relative to said body after said cassette is placed into said light-tight enclosure and into said means for receiving a supply of media sheets with said cover in its closed position.

34. An apparatus as defined in claim 33, further characterized by:

said cover being a tambour cover slidable relative to said body between said open and closed positions.

35. An apparatus as defined in claim 34, further characterized by:

said means for moving said cover from said closed to said open position being an engagement member carried by said transport means for movement in one direction relative to said frame and which engagement member when moved in said one direction is engagable with said tambour cover to move it from said closed to said open position relative to said cassette body.

36. An apparatus for exposing images on media sheets, said apparatus comprising:

a frame;

means carried by said frame providing an exposure station having a support surface for supporting one at a time sheets of media for the optical exposure of images thereon;

a scanning mechanism associated with said exposure station for exposing an image on a media sheet supported on said support surface;

a supply cassette for containing a supply of media sheets and for holding them in flat condition, said supply cassette having a box-like body and a cover movable between open and close positions relative to said body;

means providing a supply station carried by said frame for removably receiving said supply cassette;

transport means for transporting media sheets one at a time from said supply cassette to said exposure station;

means providing a light-tight enclosure for said exposure station, said scanning means, said supply station and said transport means; and means for moving said cover of said supply cassette from said closed position to said open position relative to said body after said supply cassette is placed into said light-tight enclosure and into said supply station with said cover in its closed position;

said cover being a tambour cover slidable relative to said body between said open and closed positions; and said means for moving said cover from said closed to said open position being an engagement member carried by said transport means for movement in one direction relative to said frame and which engagement member when moved in said one direction is engagable with said tambour cover to move it from said closed to said open position relative to said cassette body.

37. An apparatus for exposing images on media sheets, said apparatus comprising:

a frame;

means carried by said frame providing an exposure station having a support surface for supporting one at a time sheets of media for the optical exposure of images thereon;

a scaning mechanism associated with said exposure station for exposing an image on a media sheet supported on said support surface;

a supply cassette for containing a supply of media sheets and for holding them in flat condition, said supply cassette having a box-like body and a cover movable between open and close positions relative to said body;

means providing a supply station carried by said frame for removably receiving said supply cassette;

transport means for transporting media sheets one at a time from said supply cassette to said exposure station;

means providing a light-tight enclosure for said exposure station, said scanning means, said supply station and said transport means;

means for moving said cover of said supply cassette from said closed position to said open position relative to said body after said supply cassette is placed into said light-tight enclosure and into said supply station with said cover in its closed position;

a dolly carrying and vertically supporting said cassette and movable into and out of said light-tight enclosure to move said cassette between said supply station of said apparatus and a remote location outside of said light-tight enclosure at which remote locate a fresh supply of media sheets may be loaded into said cassette; and said cassette being tiltable about a horizontal axis fixed relative to said dolly between a generally horizontal position at which it is receivable by said supply station and a tilted position at which it is inclined to a horizontal plane to facilitate loading of media sheets into the cassette at said remote location.

* * * * *